United States Patent
Zhu et al.

(10) Patent No.: US 11,303,332 B2
(45) Date of Patent: Apr. 12, 2022

(54) UPLINK ANTENNA SELECTION METHOD AND APPARATUS

(71) Applicant: Huawei Technologies Co., Ltd., Shenzhen (CN)

(72) Inventors: Huiying Zhu, Shanghai (CN); Liuliu Ji, Shanghai (CN); Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/033,119

(22) Filed: Sep. 25, 2020

(65) Prior Publication Data

US 2021/0013936 A1   Jan. 14, 2021

Related U.S. Application Data

(63) Continuation of application No. PCT/CN2018/081884, filed on Apr. 4, 2018.

(51) Int. Cl.
| | | |
|---|---|---|
| *H04B 7/02* | (2018.01) | |
| *H04B 7/0456* | (2017.01) | |
| *H04B 7/06* | (2006.01) | |

(52) U.S. Cl.
CPC ......... *H04B 7/0456* (2013.01); *H04B 7/0608* (2013.01)

(58) Field of Classification Search
CPC ............................ H04B 7/0456; H04B 7/0608
USPC ................ 375/267, 261, 259, 316, 219, 295
See application file for complete search history.

(56) References Cited

U.S. PATENT DOCUMENTS

| | | | |
|---|---|---|---|
| 2014/0056380 A1 | 2/2014 | Wu et al. | |
| 2014/0205038 A1 | 7/2014 | Nakamura et al. | |
| 2020/0119953 A1* | 4/2020 | Chen | ................... H04L 5/0051 |
| 2020/0275260 A1* | 8/2020 | Huang | ................. H04L 5/0048 |

FOREIGN PATENT DOCUMENTS

| | | |
|---|---|---|
| CN | 101599788 A | 12/2009 |
| CN | 101867460 A | 10/2010 |
| CN | 102255705 A | 11/2011 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 15), 3GPP TS 36.213 V15.1.0 (Mar. 2018) 501 pages.

(Continued)

*Primary Examiner* — Zewdu A Kassa
(74) *Attorney, Agent, or Firm* — Slater Matsil, LLP

(57) ABSTRACT

A method includes: receiving, from a network device, an index of a precoding matrix and a quantity of layers for uplink transmission; determining a first target codebook based on the quantity of layers for uplink transmission and a quantity of physical antennas of a communications apparatus, where the first target codebook includes a plurality of first precoding matrices; and determining, based on a first target precoding matrix that corresponds to the index and that is in the plurality of first precoding matrices, a target physical antenna used by the communications apparatus to send uplink information.

19 Claims, 5 Drawing Sheets

(56) References Cited

FOREIGN PATENT DOCUMENTS

| | | |
|---|---|---|
| CN | 102368698 A | 3/2012 |
| CN | 102938687 A | 2/2013 |
| CN | 103036601 A | 4/2013 |
| CN | 105187107 A | 12/2015 |
| CN | 107148761 A | 9/2017 |
| CN | 107852279 A | 3/2018 |
| WO | 2015084051 A1 | 6/2015 |
| WO | 2015180178 A1 | 12/2015 |
| WO | 2016204591 A1 | 12/2016 |

OTHER PUBLICATIONS

3rd Generation Partnership Project; Technical Specification Group Radio Access Network; Evolved Universal Terrestrial Radio Access (E-UTRA); Multiplexing and channel coding (Release 15), 3GPP TS 36.212 V15.1.0 (Mar. 2018), 234 pages.

Intel Corporation, "Remaining Issues on Codebook Based UL Transmission", 3GPP TSG RAN WG1 Meeting 90bis, R-1717362, Prague, CZ, Oct. 9-13, 2017, 6 pages.

* cited by examiner

UPLINK ANTENNA SELECTION METHOD AND APPARATUS

CROSS-REFERENCE TO RELATED APPLICATIONS

This application claims the benefit of International Filing No. PCT/CN2018/081884, filed on Apr. 4, 2018, which application is hereby incorporated herein by reference.

TECHNICAL FIELD

Embodiments of this application relate to communications engineering technologies, and in particular, to an uplink antenna selection method and an apparatus.

BACKGROUND

When a communications apparatus of a user (UE) has a limited capability, a few antenna radio frequency circuits are configured for the UE, and usually, a quantity of transmit antenna channels is less than a quantity of receive antenna channels. A physical uplink shared channel (PUSCH) uplink antenna selection technology means that UE selects at least one physical antenna from a plurality of physical antennas to send uplink data.

For a long term evolution (LTE) technology, because UEs have different capabilities, a quantity of configured transmit antenna channels is different from a quantity of configured receive antenna channels (where a same physical antenna may be shared in sending and receiving performed by the UE). Based on different UE capabilities, some UEs support one transmit antenna channel and two receive antenna channels (that is, 1T2R), some UEs support one transmit antenna channel and four receive antenna channels (that is, 1T4R), some UEs support two transmit antenna channels and four receive antenna channels (that is, 2T4R), and still some UEs support one transmit antenna channel and eight receive antenna channels (that is, 1T8R).

Currently, an existing LTE protocol supports uplink antenna selection only in a case of 1T2R. For example, when closed-loop uplink antenna selection of the UE is enabled by using higher layer signaling, the UE performs uplink antenna selection for a PUSCH based on downlink control information (DCI) Format 0 and recently received signaling. Alternatively, when the UE has a plurality of serving base stations, the UE determines an antenna corresponding to a PUSCH, at a same antenna port indicated by given subframes in DCI Format 0, based on a physical downlink control channel (PDCCH for short)/enhanced physical downlink control channel (EPDCCH) corresponding to each base station.

However, how to select a physical antenna from a plurality of physical antennas to send uplink information for the foregoing different terminal capabilities is an urgent problem to be resolved.

SUMMARY

Embodiments of this application provide an uplink antenna selection method and an apparatus, so that communications apparatuses with various antenna capabilities can select, from a plurality of physical antennas, a physical antenna used to send uplink information.

According to a first aspect, an embodiment of this application provides an uplink antenna selection method, including: receiving, from a network device, an index of a precoding matrix and a quantity of layers for uplink transmission; determining a first target codebook based on the quantity of layers and a quantity of physical antennas of a communications apparatus, where the first target codebook includes a plurality of first precoding matrices; and determining, based on a first target precoding matrix that corresponds to the index and that is in the plurality of first precoding matrices, a target physical antenna used by the communications apparatus to send uplink information.

In this solution, the first target codebook is determined based on the quantity of layers for uplink transmission that is sent by the network device and the quantity of physical antennas of the communications apparatus, and a precoding matrix that corresponds to the index and that is in the first target codebook is determined based on the index sent by the network device. The precoding matrix may indicate a physical antenna used to send uplink information, so that terminal devices with various antenna capabilities can select, from a plurality of physical antennas, a physical antenna used to send uplink information.

The first precoding matrix has the following features:

(1) rows of the first precoding matrix are in a one-to-one correspondence with the physical antennas of the communications apparatus, and a physical antenna corresponding to a row that includes a non-zero element and that is in the first precoding matrix is a physical antenna used to send uplink information;

(2) a quantity of rows that include a non-zero element and that are in the first precoding matrix is greater than or equal to 1 and less than or equal to a quantity of physical antennas that are supported by the communications apparatus and that are simultaneously used for uplink transmission;

(3) a quantity of columns of the first precoding matrix is the same as the quantity of layers;

(4) a normalization coefficient of the first precoding matrix is a reciprocal of a square root of a sum of squares of non-zero elements in the first precoding matrix, where this feature can ensure that a sum of energy allocated to the physical antennas simultaneously used to send uplink information is 1, rather than that all the antennas equally share power, thereby ensuring effective sending of the uplink information; and (5) the first precoding matrix satisfies a preset condition, and the preset condition is $$W^T W = \begin{bmatrix} D_{11} & 0 \\ 0 & D_{12} \end{bmatrix},$$

or the preset condition is $$W^T W = \begin{bmatrix} 0 & D_{12} \\ D_{21} & 0 \end{bmatrix},$$

where

W is the first precoding matrix, $W^T$ is a conjugate transpose matrix of the first precoding matrix, $$\begin{bmatrix} D_{11} & 0 \\ 0 & D_{12} \end{bmatrix}$$

is a diagonal matrix, and $$\begin{bmatrix} 0 & D_{12} \\ D_{21} & 0 \end{bmatrix}$$

is a diagonal matrix.

This feature can eliminate inter-channel interference as much as possible.

The first target codebook has the following possible forms:

Form 1: When the quantity of layers is 1 and the quantity of physical antennas of the communications apparatus is 4, the first target codebook includes:

$$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}$$

$$\frac{1}{\sqrt{2}}\begin{bmatrix} 1 \\ 0 \\ 1 \\ 0 \end{bmatrix}, \frac{1}{\sqrt{2}}\begin{bmatrix} 1 \\ 0 \\ -1 \\ 0 \end{bmatrix}, \frac{1}{\sqrt{2}}\begin{bmatrix} 1 \\ 0 \\ j \\ 0 \end{bmatrix}, \frac{1}{\sqrt{2}}\begin{bmatrix} 1 \\ 0 \\ -j \\ 0 \end{bmatrix}$$

$$\frac{1}{\sqrt{2}}\begin{bmatrix} 0 \\ 1 \\ 0 \\ 1 \end{bmatrix}, \frac{1}{\sqrt{2}}\begin{bmatrix} 0 \\ 1 \\ 0 \\ -1 \end{bmatrix}, \frac{1}{\sqrt{2}}\begin{bmatrix} 0 \\ 1 \\ 0 \\ j \end{bmatrix}, \frac{1}{\sqrt{2}}\begin{bmatrix} 0 \\ 1 \\ 0 \\ -j \end{bmatrix}$$

$$\frac{1}{\sqrt{2}}\begin{bmatrix} 1 \\ 1 \\ 0 \\ 0 \end{bmatrix}, \frac{1}{\sqrt{2}}\begin{bmatrix} 1 \\ -1 \\ 0 \\ 0 \end{bmatrix}, \frac{1}{\sqrt{2}}\begin{bmatrix} 1 \\ j \\ 0 \\ 0 \end{bmatrix}, \frac{1}{\sqrt{2}}\begin{bmatrix} 1 \\ -j \\ 0 \\ 0 \end{bmatrix}$$

$$\frac{1}{\sqrt{2}}\begin{bmatrix} 0 \\ 0 \\ 1 \\ 1 \end{bmatrix}, \frac{1}{\sqrt{2}}\begin{bmatrix} 0 \\ 0 \\ 1 \\ -1 \end{bmatrix}, \frac{1}{\sqrt{2}}\begin{bmatrix} 0 \\ 0 \\ 1 \\ j \end{bmatrix}, \frac{1}{\sqrt{2}}\begin{bmatrix} 0 \\ 0 \\ 1 \\ -j \end{bmatrix}$$

$$\frac{1}{\sqrt{2}}\begin{bmatrix} 0 \\ 1 \\ 1 \\ 0 \end{bmatrix}, \frac{1}{\sqrt{2}}\begin{bmatrix} 0 \\ 1 \\ -1 \\ 0 \end{bmatrix}, \frac{1}{\sqrt{2}}\begin{bmatrix} 0 \\ 1 \\ j \\ 0 \end{bmatrix}, \frac{1}{\sqrt{2}}\begin{bmatrix} 0 \\ 1 \\ -j \\ 0 \end{bmatrix}$$

$$\frac{1}{\sqrt{2}}\begin{bmatrix} 1 \\ 0 \\ 0 \\ 1 \end{bmatrix}, \frac{1}{\sqrt{2}}\begin{bmatrix} 1 \\ 0 \\ 0 \\ -1 \end{bmatrix}, \frac{1}{\sqrt{2}}\begin{bmatrix} 1 \\ 0 \\ 0 \\ j \end{bmatrix}, \frac{1}{\sqrt{2}}\begin{bmatrix} 1 \\ 0 \\ 0 \\ -j \end{bmatrix}$$

Form 2: When the quantity of layers is 2 and the quantity of physical antennas of the communications apparatus is 4, the first target codebook includes:

$$\frac{1}{\sqrt{2}}\begin{bmatrix} 1 & 0 \\ 0 & 0 \\ 0 & 1 \\ 0 & 0 \end{bmatrix}, \frac{1}{2}\begin{bmatrix} 1 & 1 \\ 0 & 0 \\ 1 & -1 \\ 0 & 0 \end{bmatrix}, \frac{1}{2}\begin{bmatrix} 1 & 1 \\ 0 & 0 \\ j & -j \\ 0 & 0 \end{bmatrix}$$

$$\frac{1}{\sqrt{2}}\begin{bmatrix} 0 & 0 \\ 1 & 0 \\ 0 & 0 \\ 0 & 1 \end{bmatrix}, \frac{1}{2}\begin{bmatrix} 0 & 0 \\ 1 & 1 \\ 0 & 0 \\ 1 & -1 \end{bmatrix}, \frac{1}{2}\begin{bmatrix} 0 & 0 \\ 1 & 1 \\ 0 & 0 \\ j & -j \end{bmatrix}$$

$$\frac{1}{\sqrt{2}}\begin{bmatrix} 1 & 0 \\ 0 & 1 \\ 0 & 0 \\ 0 & 0 \end{bmatrix}, \frac{1}{2}\begin{bmatrix} 1 & 1 \\ 1 & -1 \\ 0 & 0 \\ 0 & 0 \end{bmatrix}, \frac{1}{2}\begin{bmatrix} 1 & 1 \\ j & -j \\ 0 & 0 \\ 0 & 0 \end{bmatrix}$$

$$\frac{1}{\sqrt{2}}\begin{bmatrix} 0 & 0 \\ 0 & 0 \\ 1 & 0 \\ 0 & 1 \end{bmatrix}, \frac{1}{2}\begin{bmatrix} 0 & 0 \\ 0 & 0 \\ 1 & 1 \\ 1 & -1 \end{bmatrix}, \frac{1}{2}\begin{bmatrix} 0 & 0 \\ 0 & 0 \\ 1 & 1 \\ j & -j \end{bmatrix}$$

$$\frac{1}{\sqrt{2}}\begin{bmatrix} 0 & 0 \\ 1 & 0 \\ 0 & 1 \\ 0 & 0 \end{bmatrix}, \frac{1}{2}\begin{bmatrix} 0 & 0 \\ 1 & 1 \\ 1 & -1 \\ 0 & 0 \end{bmatrix}, \frac{1}{2}\begin{bmatrix} 0 & 0 \\ 1 & 1 \\ j & -j \\ 0 & 0 \end{bmatrix}$$

$$\frac{1}{\sqrt{2}}\begin{bmatrix} 1 & 0 \\ 0 & 0 \\ 0 & 0 \\ 0 & 1 \end{bmatrix}, \frac{1}{2}\begin{bmatrix} 1 & 1 \\ 0 & 0 \\ 0 & 0 \\ 1 & -1 \end{bmatrix}, \frac{1}{2}\begin{bmatrix} 1 & 1 \\ 0 & 0 \\ 0 & 0 \\ j & -j \end{bmatrix}$$

Form 3: When the quantity of layers is 1 and the quantity of physical antennas of the communications apparatus is 4, the first target codebook includes:

$$\frac{1}{2}\begin{bmatrix} 1 \\ 1 \\ 1 \\ -1 \end{bmatrix}, \frac{1}{2}\begin{bmatrix} 1 \\ 1 \\ j \\ j \end{bmatrix}, \frac{1}{2}\begin{bmatrix} 1 \\ 1 \\ -1 \\ 1 \end{bmatrix}, \frac{1}{2}\begin{bmatrix} 1 \\ 1 \\ -j \\ -j \end{bmatrix}, \frac{1}{2}\begin{bmatrix} 1 \\ j \\ 1 \\ j \end{bmatrix}, \frac{1}{2}\begin{bmatrix} 1 \\ j \\ j \\ -1 \end{bmatrix}, \frac{1}{2}\begin{bmatrix} 1 \\ j \\ -1 \\ -j \end{bmatrix}, \frac{1}{2}\begin{bmatrix} 1 \\ j \\ -j \\ -1 \end{bmatrix}$$

$$\frac{1}{2}\begin{bmatrix} 1 \\ -1 \\ 1 \\ 1 \end{bmatrix}, \frac{1}{2}\begin{bmatrix} 1 \\ -1 \\ j \\ -j \end{bmatrix}, \frac{1}{2}\begin{bmatrix} 1 \\ -1 \\ -1 \\ -1 \end{bmatrix}, \frac{1}{2}\begin{bmatrix} 1 \\ -1 \\ -j \\ j \end{bmatrix}, \frac{1}{2}\begin{bmatrix} 1 \\ -j \\ 1 \\ -j \end{bmatrix}, \frac{1}{2}\begin{bmatrix} 1 \\ -j \\ j \\ -1 \end{bmatrix}, \frac{1}{2}\begin{bmatrix} 1 \\ -j \\ -1 \\ j \end{bmatrix}, \frac{1}{2}\begin{bmatrix} 1 \\ -j \\ -j \\ 1 \end{bmatrix}$$

$$\frac{1}{\sqrt{2}}\begin{bmatrix} 1 \\ 0 \\ 1 \\ 0 \end{bmatrix}, \frac{1}{\sqrt{2}}\begin{bmatrix} 1 \\ 0 \\ -1 \\ 0 \end{bmatrix}, \frac{1}{\sqrt{2}}\begin{bmatrix} 1 \\ 0 \\ j \\ 0 \end{bmatrix}, \frac{1}{\sqrt{2}}\begin{bmatrix} 1 \\ 0 \\ -j \\ 0 \end{bmatrix}$$

$$\frac{1}{\sqrt{2}}\begin{bmatrix} 0 \\ 1 \\ 0 \\ 1 \end{bmatrix}, \frac{1}{\sqrt{2}}\begin{bmatrix} 0 \\ 1 \\ 0 \\ -1 \end{bmatrix}, \frac{1}{\sqrt{2}}\begin{bmatrix} 0 \\ 1 \\ 0 \\ j \end{bmatrix}, \frac{1}{\sqrt{2}}\begin{bmatrix} 0 \\ 1 \\ 0 \\ -j \end{bmatrix}$$

$$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}, \frac{1}{\sqrt{2}}\begin{bmatrix} 1 \\ 1 \\ 0 \\ 0 \end{bmatrix}, \frac{1}{\sqrt{2}}\begin{bmatrix} 1 \\ -1 \\ 0 \\ 0 \end{bmatrix}, \frac{1}{\sqrt{2}}\begin{bmatrix} 1 \\ j \\ 0 \\ 0 \end{bmatrix}, \frac{1}{\sqrt{2}}\begin{bmatrix} 1 \\ -j \\ 0 \\ 0 \end{bmatrix}$$

$$\frac{1}{\sqrt{2}}\begin{bmatrix} 0 \\ 0 \\ 1 \\ 1 \end{bmatrix}, \frac{1}{\sqrt{2}}\begin{bmatrix} 0 \\ 0 \\ 1 \\ -1 \end{bmatrix}, \frac{1}{\sqrt{2}}\begin{bmatrix} 0 \\ 0 \\ 1 \\ j \end{bmatrix}, \frac{1}{\sqrt{2}}\begin{bmatrix} 0 \\ 0 \\ 1 \\ -j \end{bmatrix}$$

$$\frac{1}{\sqrt{2}}\begin{bmatrix}0\\1\\1\\0\end{bmatrix} \quad \frac{1}{\sqrt{2}}\begin{bmatrix}0\\1\\-1\\0\end{bmatrix} \quad \frac{1}{\sqrt{2}}\begin{bmatrix}0\\1\\j\\0\end{bmatrix} \quad \frac{1}{\sqrt{2}}\begin{bmatrix}0\\1\\-j\\0\end{bmatrix}$$

$$\frac{1}{\sqrt{2}}\begin{bmatrix}1\\0\\0\\1\end{bmatrix} \quad \frac{1}{\sqrt{2}}\begin{bmatrix}1\\0\\0\\-1\end{bmatrix} \quad \frac{1}{\sqrt{2}}\begin{bmatrix}1\\0\\0\\j\end{bmatrix} \quad \frac{1}{\sqrt{2}}\begin{bmatrix}1\\0\\0\\-j\end{bmatrix}$$

Form 4: When the quantity of layers is 2 and the quantity of physical antennas of the communications apparatus is 4, the first target codebook includes:

$$\frac{1}{2}\begin{bmatrix}1&0\\1&0\\0&1\\0&-j\end{bmatrix} \quad \frac{1}{2}\begin{bmatrix}1&0\\1&0\\0&1\\0&j\end{bmatrix} \quad \frac{1}{2}\begin{bmatrix}1&1\\-j&0\\0&1\\0&1\end{bmatrix} \quad \frac{1}{2}\begin{bmatrix}1&1\\-j&0\\0&1\\0&-1\end{bmatrix}$$

$$\frac{1}{2}\begin{bmatrix}1&0\\-1&0\\0&1\\0&-j\end{bmatrix} \quad \frac{1}{2}\begin{bmatrix}1&0\\-1&0\\0&1\\0&j\end{bmatrix} \quad \frac{1}{2}\begin{bmatrix}1&1\\j&0\\0&1\\0&1\end{bmatrix} \quad \frac{1}{2}\begin{bmatrix}1&0\\j&0\\0&1\\0&-1\end{bmatrix}$$

$$\frac{1}{2}\begin{bmatrix}1&0\\0&1\\0&0\\0&1\end{bmatrix} \quad \frac{1}{2}\begin{bmatrix}1&0\\0&1\\1&0\\0&-j\end{bmatrix} \quad \frac{1}{2}\begin{bmatrix}1&0\\0&1\\-1&0\\0&1\end{bmatrix} \quad \frac{1}{2}\begin{bmatrix}1&0\\0&1\\-1&0\\0&-1\end{bmatrix}$$

$$\frac{1}{2}\begin{bmatrix}1&0\\0&1\\0&1\\1&0\end{bmatrix} \quad \frac{1}{2}\begin{bmatrix}1&0\\0&1\\0&-1\\1&0\end{bmatrix} \quad \frac{1}{2}\begin{bmatrix}1&0\\0&1\\0&1\\-1&0\end{bmatrix} \quad \frac{1}{2}\begin{bmatrix}1&0\\0&1\\0&-1\\-1&0\end{bmatrix}$$

$$\frac{1}{\sqrt{2}}\begin{bmatrix}1&0\\0&0\\0&1\\0&0\end{bmatrix} \quad \frac{1}{2}\begin{bmatrix}1&0\\0&0\\1&-1\\0&0\end{bmatrix} \quad \frac{1}{2}\begin{bmatrix}1&1\\0&0\\j&-j\\0&0\end{bmatrix}$$

$$\frac{1}{\sqrt{2}}\begin{bmatrix}0&0\\1&0\\0&0\\0&1\end{bmatrix} \quad \frac{1}{2}\begin{bmatrix}0&0\\1&1\\0&0\\1&-1\end{bmatrix} \quad \frac{1}{2}\begin{bmatrix}0&0\\1&1\\0&0\\j&-j\end{bmatrix}$$

$$\frac{1}{\sqrt{2}}\begin{bmatrix}1&0\\0&1\\0&0\\0&0\end{bmatrix} \quad \frac{1}{2}\begin{bmatrix}1&1\\1&-1\\0&0\\0&0\end{bmatrix} \quad \frac{1}{2}\begin{bmatrix}1&1\\j&-j\\0&0\\0&0\end{bmatrix}$$

$$\frac{1}{\sqrt{2}}\begin{bmatrix}0&0\\0&0\\1&0\\0&1\end{bmatrix} \quad \frac{1}{2}\begin{bmatrix}0&0\\0&0\\1&1\\1&-1\end{bmatrix} \quad \frac{1}{2}\begin{bmatrix}0&0\\0&0\\1&1\\j&-j\end{bmatrix}$$

$$\frac{1}{\sqrt{2}}\begin{bmatrix}0&0\\1&0\\0&1\\0&0\end{bmatrix} \quad \frac{1}{2}\begin{bmatrix}0&0\\1&1\\1&-1\\0&0\end{bmatrix} \quad \frac{1}{2}\begin{bmatrix}0&0\\1&1\\j&-j\\0&0\end{bmatrix}$$

$$\frac{1}{\sqrt{2}}\begin{bmatrix}1&0\\0&0\\0&0\\0&1\end{bmatrix} \quad \frac{1}{2}\begin{bmatrix}1&1\\0&0\\0&0\\1&-1\end{bmatrix} \quad \frac{1}{2}\begin{bmatrix}1&1\\0&0\\0&0\\j&-j\end{bmatrix}$$

In a possible design, the method further includes: sending antenna capability reporting information to the network device, where the antenna capability reporting information is used to indicate an antenna capability of the communications apparatus, and the antenna capability of the communications apparatus includes: the communications apparatus supports closed-loop antenna selection; the quantity of physical antennas included in the communications apparatus; the quantity of physical antennas that are supported by the communications apparatus and that are simultaneously used for uplink transmission; or a physical antenna that is supported by the communications apparatus and that is simultaneously used for uplink transmission.

In a possible design, the first target codebook is a subset of a first codebook; and the method further includes: obtaining the first target codebook based on the antenna capability of the communications apparatus and the first codebook, where the antenna capability of the communications apparatus includes: the communications apparatus supports closed-loop antenna selection; the quantity of physical antennas included in the communications apparatus; the quantity of physical antennas that are supported by the communications apparatus and that are simultaneously used for uplink transmission; or the physical antenna that is supported by the communications apparatus and that is simultaneously used for uplink transmission.

In the solution of obtaining the first target codebook, the communications apparatus does not need to interact with the network device, thereby reducing overheads.

In a possible design, the first target codebook is a subset of a first codebook; and the method further includes: receiving first indication information from the network device; and obtaining the first target codebook based on the first indication information.

The first indication information is used to indicate a precoding matrix that is in the first codebook and that is used to obtain the first target codebook; the first indication information is used to indicate a precoding matrix that is in the first codebook and that is not used to obtain the first target codebook; the first indication information is used to indicate a precoding matrix group that is in the first codebook and that is used to obtain the first target codebook, and the precoding matrix group includes precoding matrices that are in the first codebook and that are used to obtain the first target codebook; or the first indication information is used to indicate a precoding matrix group that is in the first codebook and that is not used to obtain the first target codebook, and the precoding matrix group includes precoding matrices that are in the first codebook and that are not used to obtain the first target codebook.

In a possible design, the first target codebook is a subset of a first codebook; and the receiving, from a network device, an index of a precoding matrix includes: receiving downlink control information DCI from the network device, where the DCI includes the index of the precoding matrix; and the determining a first target codebook based on the quantity of layers and a quantity of physical antennas included in a communications apparatus includes: determining the first codebook based on the quantity of layers and the quantity of physical antennas included in the communications apparatus; and obtaining the first target codebook based on a time domain occupied by the DCI, where the first codebook includes a first precoding matrix group and a second precoding matrix group, and if the time domain occupied by the DCI is odd-numbered, the first precoding matrix group is used to obtain the first target codebook, or if the time domain occupied by the DCI is even-numbered, the second precoding matrix group is used to obtain the first target codebook.

In a possible design, the first target codebook is a subset of a first codebook; and the receiving, from a network device, an index of a precoding matrix includes: receiving downlink control information DCI from the network device, where the DCI includes the index of the precoding matrix; and the determining a first target codebook based on the quantity of layers and a quantity of physical antennas included in a communications apparatus includes: determining the first codebook based on the quantity of layers and the quantity of physical antennas included in the communications apparatus; and obtaining the first target codebook based on a mask of the DCI, where the first codebook includes a first precoding matrix group and a second precoding matrix group, and if the mask of the DCI is a first mask, the first precoding matrix group is used to obtain the first target codebook, or if the mask of the DCI is a second mask, the second precoding matrix group is used to obtain the first target codebook.

In a possible design, the communications apparatus supports: one transmit antenna channel and two receive antenna channels; one transmit antenna channel and four receive antenna channels; two transmit antenna channels and four receive antenna channels; one transmit antenna channel and eight receive antenna channels; or two transmit antenna channels and eight receive antenna channels.

According to a second aspect, an embodiment of this application provides an uplink antenna selection method, including: determining a quantity of layers for uplink transmission and a quantity of physical antennas of a communications apparatus; determining a first target precoding matrix based on the quantity of layers for uplink transmission and the quantity of physical antennas of the communications apparatus; and sending the quantity of layers and an index of the first target precoding matrix in a first target codebook to the communications apparatus, where the first target precoding matrix is used to indicate a target physical antenna used by the communications apparatus to send uplink information.

In this solution, the network device determines the quantity of layers for uplink transmission and the first target precoding matrix, and sends the quantity of layers for uplink transmission and the index of the first target precoding matrix in the first target codebook to the communications apparatus, so that the communications apparatus determines the first target precoding matrix based on the quantity of layers and the index, and determines, based on the physical antennas that are used to send the uplink information and that are indicated by the first precoding matrix, the physical antenna used to send uplink information. Therefore, terminal devices with various antenna capabilities can select, from a plurality of physical antennas, a physical antenna used to send uplink information.

The first target codebook includes a plurality of first precoding matrices, and the first precoding matrix has the following features:

(1) rows of the first precoding matrix are in a one-to-one correspondence with the physical antennas of the communications apparatus, where a physical antenna corresponding to a row that includes a non-zero element and that is in the first precoding matrix is a physical antenna used to send uplink information;

(2) a quantity of rows that include a non-zero element and that are in the first precoding matrix is greater than or equal to 1 and less than or equal to a quantity of physical antennas that are supported by the communications apparatus and that are simultaneously used for uplink transmission;

(3) a quantity of columns of the first precoding matrix is the same as the quantity of layers;

(4) a normalization coefficient of the first precoding matrix is a reciprocal of a square root of a sum of squares of non-zero elements in the first precoding matrix; and (5) the first precoding matrix satisfies a preset condition, and the preset condition is $$W^T W = \begin{bmatrix} D_{11} & 0 \\ 0 & D_{12} \end{bmatrix},$$

or the preset condition is $$W^T W = \begin{bmatrix} 0 & D_{12} \\ D_{21} & 0 \end{bmatrix},$$

where

W is the first precoding matrix, $W^T$ is a conjugate transpose matrix of the first precoding matrix, $$\begin{bmatrix} D_{11} & 0 \\ 0 & D_{12} \end{bmatrix}$$

is a diagonal matrix, and $$\begin{bmatrix} 0 & D_{12} \\ D_{21} & 0 \end{bmatrix}$$

is a diagonal matrix.

A form of the first target codebook is the same as the form of the first target codebook in the first aspect, because codebooks stored on the network device side and the communications apparatus side are the same.

In a possible design, the determining a quantity of physical antennas of a communications apparatus includes: receiving antenna capability reporting information from the communications apparatus, where the antenna capability reporting information is used to indicate an antenna capability of the communications apparatus, and the antenna capability of the communications apparatus includes: the quantity of physical antennas of the communications apparatus.

In a possible design, the determining a first target precoding matrix based on the quantity of layers for uplink transmission and the quantity of physical antennas of the communications apparatus includes: obtaining the first target codebook corresponding to the quantity of layers for uplink transmission and the quantity of physical antennas included in the communications apparatus; and determining the first target precoding matrix in the first target codebook.

In a possible design, the first target codebook is a subset of a first codebook; and the determining a first target precoding matrix based on the quantity of layers for uplink transmission and the quantity of physical antennas included in the communications apparatus includes: obtaining the first codebook corresponding to the quantity of layers for uplink transmission and the quantity of physical antennas included in the communications apparatus; obtaining the first target codebook based on the antenna capability of the communications apparatus or uplink channel information; and determining the first target precoding matrix in the first target codebook, where the antenna capability of the communications apparatus includes: the communications apparatus supports closed-loop antenna selection; the quantity of physical antennas included in the communications apparatus; the quantity of physical antennas that are supported by the communications apparatus and that are simultaneously used for uplink transmission; or a quantity of physical antennas that are supported by the communications apparatus and that are simultaneously used for uplink transmission.

In a possible design, the method further includes: sending first indication information to the communications apparatus, where the first indication information is used to indicate a precoding matrix that is in the first codebook and that is used to obtain the first target codebook; the first indication information is used to indicate a precoding matrix that is in the first codebook and that is not used to obtain the first target codebook; the first indication information is used to indicate a precoding matrix group that is in the first codebook and that is used to obtain the first target codebook, and the precoding matrix group includes precoding matrices that are in the first codebook and that are used to obtain the first target codebook; or the first indication information is used to indicate a precoding matrix group that is in the first codebook and that is not used to obtain the first target codebook, and the precoding matrix group includes precoding matrices that are in the first codebook and that are not used to obtain the first target codebook.

In a possible design, the first codebook includes a first precoding matrix group and a second precoding matrix group; and if the first target codebook includes the first precoding matrix group, the sending the quantity of layers and an index of the first target precoding matrix in a first target codebook to the communications apparatus includes: sending downlink control information DCI to the communications apparatus in a time domain that is even-numbered, where the DCI includes the quantity of layers and the index; and the first precoding matrix group corresponds to the time domain that is even-numbered; or if the first target codebook includes the second precoding matrix group, the sending the quantity of layers and an index of the first target precoding matrix in a first target codebook to the communications apparatus includes: sending downlink control information DCI to the communications apparatus in a time domain that is odd-numbered, where the DCI includes the quantity of layers and the index; and the second precoding matrix group corresponds to the time domain that is odd-numbered.

In a possible design, the first codebook includes a first precoding matrix group and a second precoding matrix group; and if the first target codebook includes the first precoding matrix group, the sending the quantity of layers and an index of the first target precoding matrix in a first target codebook to the communications apparatus includes: sending downlink control information DCI to the communications apparatus, where the DCI includes the quantity of layers and the index, a mask of the DCI is a first CRC mask, and the first precoding matrix group corresponds to the first CRC mask; or if the first target codebook includes the second precoding matrix group, sending DCI to the communications apparatus, where the DCI includes the quantity of layers and the index, a mask of the DCI is a second CRC mask, and the second precoding matrix group corresponds to the second CRC mask.

According to a third aspect, an embodiment of this application provides a communications apparatus, including a processor, where the processor is configured to: couple to a memory, and read and execute an instruction in the memory, to implement the uplink antenna selection method in the first aspect.

In a possible design, the communications apparatus further includes the memory.

According to a fourth aspect, an embodiment of this application provides a communications apparatus, including a processor, where the processor is configured to: couple to a memory, and read and execute an instruction in the memory, to implement the uplink antenna selection method in the second aspect.

In a possible design, the communications apparatus further includes the memory.

According to a fifth aspect, an embodiment of this application provides a computer storage medium, including an instruction. When the instruction is run on a communications apparatus, the communications apparatus is enabled to perform the uplink antenna selection method in the first aspect.

According to a sixth aspect, an embodiment of this application provides a computer storage medium, including an instruction. When the instruction is run on a communications apparatus, the communications apparatus is enabled to perform the uplink antenna selection method in the second aspect.

In the embodiments of this application, at least some precoding matrices in a codebook may indicate the physical antennas of the communications apparatus. The network device obtains the target precoding matrix based on the antenna capability supported by the communications apparatus and/or the uplink channel information, and sends an index indicator of the target precoding matrix to the communications apparatus. The communications apparatus may determine, based on the index, the target precoding matrix corresponding to the index in the codebook stored on the terminal side. The target precoding matrix determined by the network device is the same as the target precoding matrix determined by the terminal device, and a physical antenna indicated by the target precoding matrix is the determined target physical antenna that is used by the communications apparatus to send uplink information, so that uplink antenna selection of a plurality of communications apparatuses supporting different antenna capabilities is implemented. In addition, if the target precoding matrix is determined by the network device based on the uplink channel information, it is ensured that when the communications apparatus sends uplink information by using the target physical antenna, system performance is the best, that is, the communications apparatus can select the target physical antenna that enables the best system performance to send uplink information.

DETAILED DESCRIPTION OF ILLUSTRATIVE EMBODIMENTS

Figure 1:
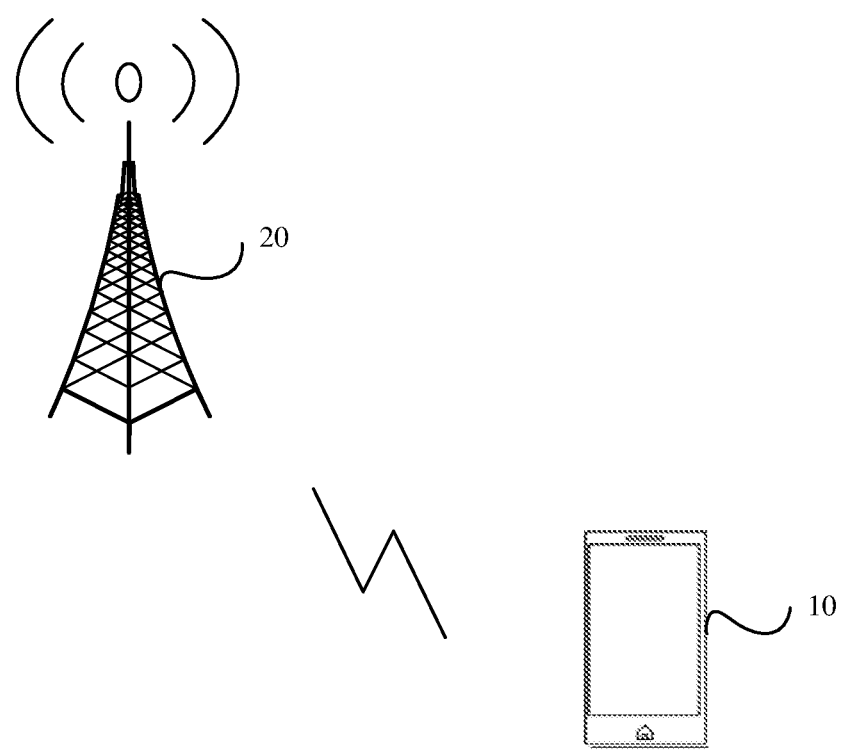
FIG. 1 is a diagram of a system architecture according to an embodiment of this application.

Some terms in this application are first described, to help a person skilled in the art have a better understanding.

1. A communications apparatus includes a terminal device. The terminal device may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The communications apparatus may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, and a next-generation communications system, for example, a communications apparatus in a fifth-generation (5G) communications network, a communications apparatus in a future evolved public land mobile network (PLMN) network, or a communications apparatus in a new radio (NR) communications system.

By way of example rather than limitation, the communications apparatus in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Wearable intelligent devices in a general sense include full-featured and large-size devices that can implement complete or partial functions without depending on smartphones, for example, smartwatches or smart glasses, and devices that focus on only one type of application function and need to work with other devices such as smartphones in use, for example, various smart bands or smart jewelry for monitoring physical signs.

In addition, the communications apparatus may alternatively be applied to an unmanned aerial vehicle, and is for example, a vehicle-mounted communications device on the unmanned aerial vehicle.

2. A network device may be a device configured to communicate with a mobile device. The network device may be an access point (AP) in a WLAN, a base transceiver station (BTS) in GSM or CDMA, or a nodeB (NB) in WCDMA, or may be an evolved NodeB (evolutional node B, eNB or eNodeB), a relay station, an access point, a vehicle-mounted device, a wearable device in LTE, a network device in a future 5G network, a network device in a future evolved PLMN network, a new generation NodeB (gNodeB) in an NR system, or the like.

In addition, in the embodiments of this application, the network device provides a service for a cell, and the communications apparatus communicates with the network device by using a transmission resource (for example, a frequency domain resource, or rather, a spectrum resource) used by the cell. The cell may be a cell corresponding to the network device (for example, a base station). The cell may be served by a macro base station, or may be served by a base station corresponding to a small cell. The small cell herein may include a metro cell, a micro cell, a pico cell, a femto cell, and the like. These small cells have characteristics of small coverage areas and low transmit power, and are applicable to providing a high-rate data transmission service.

3. Uplink channel matrix:

$$H = \begin{bmatrix} h_{11} & h_{12} & \ldots & h_{1n} & \ldots & h_{1N} \\ h_{21} & h_{22} & \ldots & h_{2n} & \ldots & h_{2n} \\ \ldots & \ldots & \ldots & \ldots & \ldots & \ldots \\ h_{m1} & h_{m2} & \ldots & h_{mn} & \ldots & h_{mN} \\ h_{M1} & h_{M2} & \ldots & h_{Mn} & \ldots & h_{MN} \end{bmatrix}.$$

$h_{mn}$ is an impulse response of a subchannel between an $m^{th}$ antenna of a receive end and an $n^{th}$ antenna of a transmit end. For the uplink channel matrix, the transmit end is the communications apparatus, and the receive end is the network device, and the impulse response is obtained by the network device based on a sounding reference signal (SRS) transmitted by using a corresponding antenna of the transmit end.

4. Open-loop antenna selection and closed-loop antenna selection: a. Open-loop antenna selection: A PUSCH is alternately transmitted between a plurality of antennas of the communications apparatus, or in other words, uplink data is alternately sent between the antennas in turn, to avoid fast fading of a single channel. b. Closed-loop antenna selection: The communications apparatus needs to send a reference signal by using different antennas, for a base station to perform channel quality measurement and then select an antenna with desirable channel quality for data sending.

5. Antenna port: The antenna port includes an antenna port used to carry an uplink data transmission channel (an uplink data channel for short, for example, a PUSCH), an antenna port used to carry a reference signal for demodulation (a demodulation reference signal for short, for example, a demodulation reference signal (DMRS)), an antenna port used to carry a reference signal for channel sounding (a channel sounding reference signal for short, for example, an SRS). To be specific, the antenna port is an antenna port used to carry a specific physical channel and/or physical signal.

For signals sent through a same antenna port, regardless of whether the signals are sent by using a same physical antenna or different physical antennas, channels corresponding to paths through which the signals pass during spatial transmission may be considered as the same or related (for example, large-scale channel features or channel matrices are the same). In other words, when demodulating signals sent through a same antenna port, a receive end may consider that channels of the signals are the same or related. In other words, the antenna port is a logical meaning, and a signal receive end usually identifies, by using the antenna port, signals having different transmission channels.

6. A physical antenna may be referred to as a user antenna, a user antenna port, a user port, or the like, or may be referred to as a transmit antenna or a receive antenna. The physical antenna may have a correspondence with a feed port of the antenna.

Generally, a physical antenna means an array element of the physical antenna. A physical antenna is also identified by using a port, but the port herein is different from an antenna port used to carry a physical channel in 5. The transmit antenna is a physical meaning, and may be associated with or not associated with an antenna port in design. Different physical antennas may be distinguished by using different identifiers or indexes.

Generally, a mapping relationship between an antenna port and a physical antenna is an implementation issue. One or more physical antennas may be weighted to form one antenna port. Mapping between an antenna port and a transmit antenna element unit of a user may also be an implementation issue of the user. The user may number the transmit antenna element subunit, and map the antenna port to the transmit antenna element unit.

In conclusion, an antenna port is a logical concept, and has no one-to-one correspondence with a physical antenna. One antenna port may be mapped to one physical antenna, one antenna port may be mapped to a plurality of physical antennas, or a plurality of antenna ports may be mapped to one physical antenna. In a transmission process, uplink data is mapped, by using a physical antenna, to an antenna port corresponding to the physical antenna to send the uplink data.

The following describes a system architecture in the embodiments of this application.

FIG. 1 is a diagram of a system architecture according to an embodiment of this application. Referring to FIG. 1, the architecture includes a communications apparatus 10 and a network device 20. The communications apparatus 10 may be, for example, UE, and the network device 20 may be a base station. A process in which the base station transmits data to the terminal is downlink transmission, and a process in which the terminal transmits data to the base station is uplink transmission.

Specifically, the network device 20 determines a quantity of layers for uplink transmission and a second target precoding matrix, and sends the quantity of layers for uplink transmission and an index of the second target precoding matrix in a second target codebook to the communications apparatus 10. The second target codebook is determined by the network device 20 based on the quantity of layers for uplink transmission and a quantity of physical antennas of the communications apparatus. The communications apparatus 10 determines a first target codebook based on the quantity of layers for uplink transmission and the quantity of physical antennas of the communications apparatus, determines a precoding matrix indicated by the index in the first target codebook as a first target precoding matrix, and determines, based on a physical antenna indicated by the first target precoding matrix, a target physical antenna used to send uplink information.

In this embodiment of this application, a precoding matrix capable of indicating a physical antenna is set. In this case, the physical antenna that is determined by the communications apparatus and that is indicated by the first target precoding matrix used for data encoding is a physical antenna selected to send uplink information, so that uplink antenna selection performed by communications apparatuses supporting different antenna capabilities are implemented.

The following uses specific embodiments to describe in detail an uplink antenna selection method in this application.

Figure 2A:
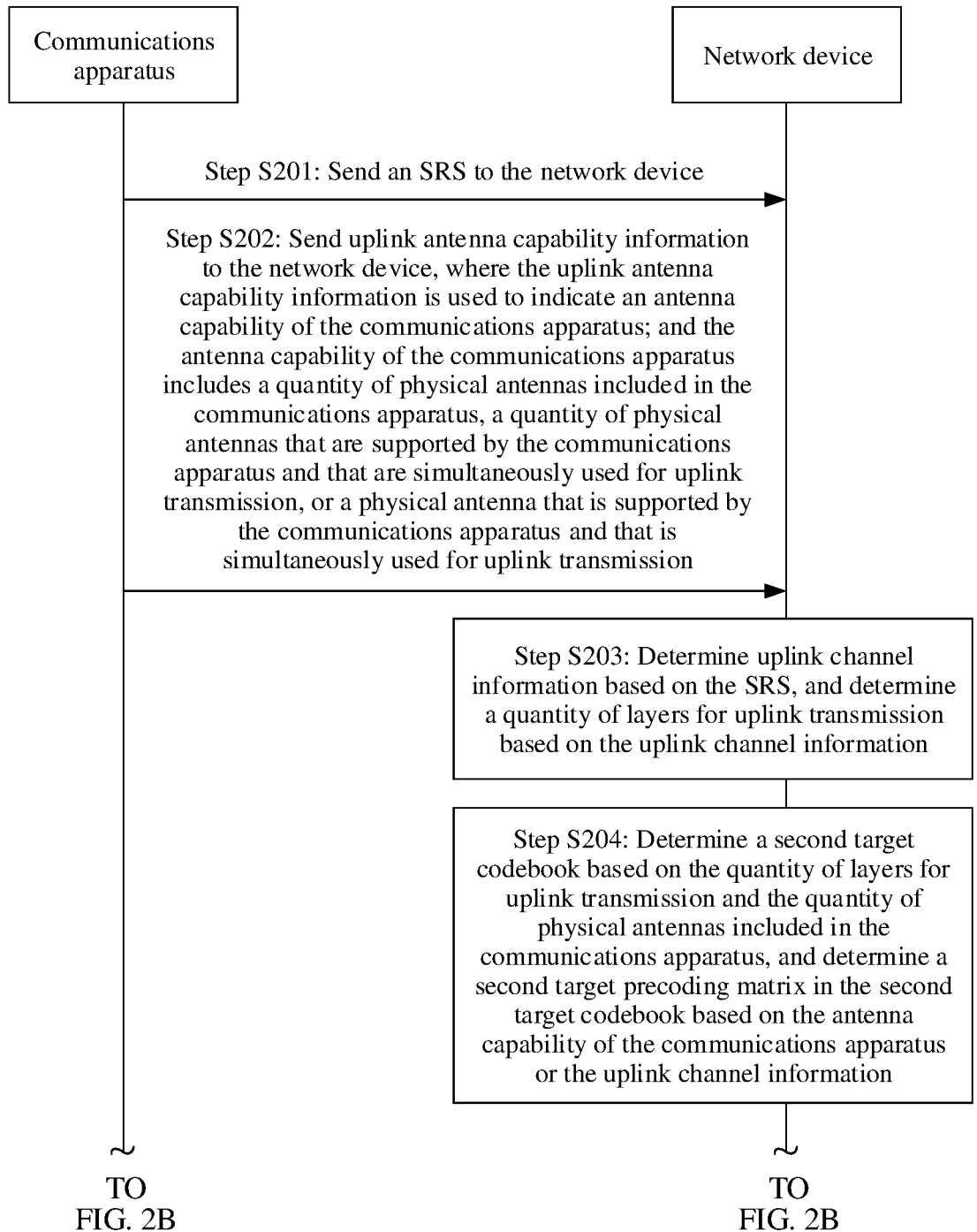
FIG. 2A and FIG. 2B are a signaling flowchart 1 of an uplink antenna selection method according to an embodiment of this application.
Figure 2B:
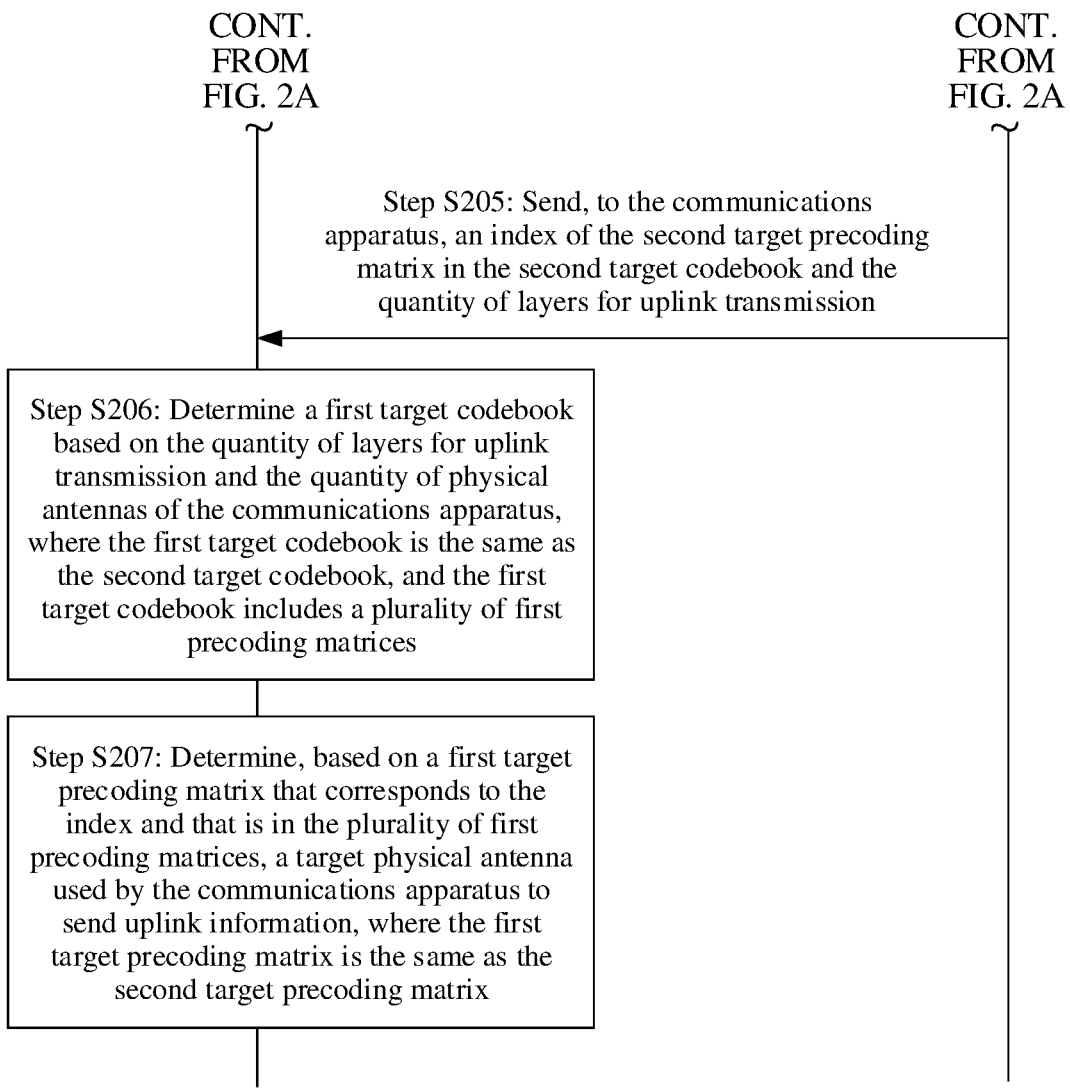

FIG. 2 is a signaling flowchart 1 of an uplink antenna selection method according to an embodiment of this application. Referring to FIG. 2, the method in this embodiment includes the following steps.

Step S201: A communications apparatus sends an SRS to a network device.

Step S202: The communications apparatus sends uplink antenna capability information to the network device, where the uplink antenna capability information is used to indicate an antenna capability of the communications apparatus; and the antenna capability of the communications apparatus includes a quantity of physical antennas included in the communications apparatus, a quantity of physical antennas that are supported by the communications apparatus and that are simultaneously used for uplink transmission, or a physical antenna that is supported by the communications apparatus and that is simultaneously used for uplink transmission.

Step S203: The network device determines uplink channel information based on the SRS, and determines a quantity of layers for uplink transmission based on the uplink channel information.

Step S204: The network device determines a second target codebook based on the quantity of layers for uplink transmission and the quantity of physical antennas included in the communications apparatus, and determines a second target precoding matrix in the second target codebook based on the antenna capability of the communications apparatus or the uplink channel information.

Step S205: The network device sends, to the communications apparatus, an index of the second target precoding matrix in the second target codebook and the quantity of layers for uplink transmission.

Step S206: The communications apparatus determines a first target codebook based on the quantity of layers for uplink transmission and the quantity of physical antennas of the communications apparatus, where the first target codebook is the same as the second target codebook, and the first target codebook includes a plurality of first precoding matrices.

Step S207: Determine, based on a first target precoding matrix that corresponds to the index and that is in the plurality of first precoding matrices, a target physical antenna used by the communications apparatus to send uplink information, where the first target precoding matrix is the same as the second target precoding matrix.

Specifically, for step S201 to step S203, each physical antenna of the communications apparatus sends the SRS to the network device. The network device determines the uplink channel information based on the SRS, and determines the quantity of layers for uplink transmission based on the uplink channel information. The quantity of layers for uplink transmission is a quantity of data streams that can be independently transmitted in parallel.

The uplink channel information is uplink channel quality related information, for example, an uplink channel matrix. In other words, the network device may obtain an uplink channel matrix based on an SRS. A rank of the uplink channel matrix is the quantity of layers for uplink transmission. For a method for obtaining the uplink channel matrix, refer to an existing method. Details are not described in this embodiment.

The communications apparatus further sends the uplink antenna capability information to the network device. Antenna capability reporting information is used to indicate the antenna capability of the communications apparatus, and the antenna capability includes:

(1) the communications apparatus supports closed-loop antenna selection;

(2) the quantity of physical antennas included in the communications apparatus;

(3) the quantity of physical antennas that are supported by the communications apparatus and that are simultaneously used for uplink transmission; or (4) the physical antenna that is supported by the communications apparatus and that is simultaneously used for uplink transmission.

A meaning of "or" between (1), (2), (3), and (4) is that the antenna capability of the communications apparatus may be (1), (2), (3), (4), (1) and (2), (3) or (4), (1) and (3), (1) and (4), (2) and (4), or (2) and (3), or may be (1), (2), and (3), (1), (2), and (4), (2), (3), and (4), (1), (3), and (4), or (1), (2), (3), and (4). In other words, the antenna capability of the communications apparatus may be the capability corresponding to any one of (1), (2), (3), and (4), the capabilities corresponding to any two of (1), (2), (3), and (4), the capabilities corresponding to any three of (1), (2), (3), and (4), or the capabilities corresponding to all of (1), (2), (3), and (4).

In a scenario of this embodiment, the antenna capability includes at least the closed-loop antenna selection capability supported by the communications apparatus and the quantity of physical antennas included in the communications apparatus.

In a case of (1): the communications apparatus supports the closed-loop antenna selection capability, and a person skilled in the art may understand that, if the communications apparatus does not support a PUSCH closed-loop antenna selection capability, the communications apparatus cannot perform uplink antenna selection.

In a case of (2): the antenna capability includes the quantity of physical antennas included in the communications apparatus, and if the communications apparatus supports 1T4R, the communications apparatus includes four physical antennas, or if the communications apparatus supports 2T8R, the communications apparatus includes eight physical antennas.

In a case of (3): the antenna capability includes the quantity of physical antennas that are supported by the communications apparatus and that are simultaneously used for uplink transmission. "Simultaneously" herein means "at a same moment". In this case, the quantity of physical antennas simultaneously used for uplink transmission is a quantity of physical antennas that can be used by the communications apparatus to send uplink information at a same moment. If the communications apparatus supports 1T4R, the quantity of physical antennas simultaneously used for uplink transmission is 1. If the communications apparatus supports 2T4R, the quantity of physical antennas simultaneously used for uplink transmission is 2.

In a case of (4): the antenna capability includes the physical antenna that is supported by the communications apparatus and that is simultaneously used for uplink transmission, and the antenna capability reporting information may include indication information of an index of a physical antenna group, to reduce information bit overheads. The physical antenna group includes at least one physical antenna. Specific descriptions are as follows:

A method for grouping all physical antennas that may be used by the communications apparatus in transmission may be predefined by the communications apparatus, or may be indicated based on signaling. The signaling may be higher layer signaling, for example, radio resource control (RRC) signaling or media access control control element (MAC CE) signaling, or may be physical layer signaling, for example, DCI signaling.

If the communications apparatus supports 1T4R, and indexes of physical antennas are sequentially 0, 1, 2, and 3, the physical antennas are divided into four groups, and each group has one antenna. In the antenna capability reporting information, 2-bit information may be used to indicate different physical antennas. For example, "00" may be used to indicate the index 0, that is, indicate the physical antenna whose index is 0. "01" may be used to indicate the index 1, that is, indicate the physical antenna whose index is 1. "10" may be used to indicate the index 2, that is, indicate the physical antenna whose index is 2. "11" may be used to indicate the index 3, that is, indicate the physical antenna whose index is 3.

For another example, if the communications apparatus supports 2T4R, four physical antennas may be divided into six groups based on different combinations, and each group includes two physical antennas. A group including a physical antenna 0 and a physical antenna 2 may be indexed 0. A group including a physical antenna 1 and a physical antenna 3 may be indexed 1. A group including the physical antenna 0 and the physical antenna 1 may be indexed 2. A group including the physical antenna 2 and the physical antenna 3 may be indexed 3. A group including the physical antenna 1 and the physical antenna 2 may be indexed 4. A group including the physical antenna 0 and the physical antenna 3 may be indexed 5. 3-bit information may be used to indicate indexes of different physical antenna groups. "000" may be used to indicate the index 0, that is, indicate the group including the physical antenna 0 and the physical antenna 2 (which may be represented as (0, 2)). "001" may be used to indicate the index 1, that is, indicate the group including the physical antenna 1 and the physical antenna 3 (which may be represented as (1, 3)). "010" may be used to indicate the index 2, that is, indicate the group including the physical antenna 0 and the physical antenna 1 (which may be represented as (0,1)). "011" may be used to indicate the index 3, that is, indicate the group including the physical antenna 2 and the physical antenna 3 (which may be represented as (2, 3)). "100" may be used to indicate the index 4, that is, indicate the group including the physical antenna 1 and the physical antenna 2 (which may be represented as (1, 2)). "101" may be used to indicate the index 5, that is, indicate the group including the physical antenna 0 and the physical antenna 3 (which may be represented as (0, 3)).

However, due to a limitation of physical hardware of the communications apparatus, some physical antenna groups of the communications apparatus cannot be used to send uplink information. In other words, if the antenna capability supported by the communications apparatus is 1T4R, a physical antenna group including the physical antenna numbered 3 may not be used to send the foregoing information due to the hardware limitation. For another example, if the antenna capability supported by the communications apparatus is 2T4R, the physical antenna group including the physical antenna numbered 0 and the physical antenna numbered 1 may not be used to send the foregoing information due to a limitation of a setting location of a radio frequency chain.

In one case, the antenna capability reporting information may directly include indication information of an index of a physical antenna that is supported by the communications apparatus and that is simultaneously used for uplink transmission, or indication information of an index of a physical antenna that is not supported by the communications apparatus and that is simultaneously used for uplink transmission. Herein, the physical antenna that is simultaneously used for uplink transmission refers to the foregoing physical antenna groups.

For example, when the communications apparatus supports 2T4R, the antenna capability reporting information may include indication information of the indexes of the foregoing physical antenna groups. For example, due to a hardware limitation of the terminal, the physical antenna group (0, 2), the physical antenna group (0, 3), the physical antenna group (1, 2), and the physical antenna group (1, 3) are physical antennas that are supported by the communications apparatus and that are simultaneously used for uplink transmission. The antenna capability reporting information may directly include indication information of the indexes of the physical antenna group (0, 2), the physical antenna group (0, 3), the physical antenna group (1, 2), and the physical antenna group (1, 3), or the antenna capability reporting information may directly include indication information of the indexes of the physical antenna group (0, 1) and the physical antenna group (2, 3).

In the foregoing case, the network device determines, based on the quantity of physical antennas that are supported by the communications apparatus and that are simultaneously used for uplink transmission, and the indication information of the indexes of the physical antenna groups that are supported by the communications apparatus and that are simultaneously used for uplink transmission, the physical antennas that are supported by the communications apparatus and that are simultaneously used for uplink transmission, where the quantity of physical antennas and the indication information are indicated in the antenna capability reporting information. Alternatively, the network device determines, based on the quantity of physical antennas that are supported by the communications apparatus and that are simultaneously used for uplink transmission, and indication information of indexes of physical antenna groups that are not supported by the communications apparatus and that are simultaneously used for uplink transmission, physical antennas that are not supported by the communications apparatus and that are simultaneously used for uplink transmission, and further determines the physical antenna that is supported by the communications apparatus and that is simultaneously used for uplink transmission, where the quantity of physical antennas and the indication information are indicated in the antenna capability reporting information.

In another case, the antenna capability reporting information includes indication information of indexes of at least some physical antennas included in the communications apparatus, and the network device combines, based on a quantity of physical antennas that are supported by the communications apparatus and that are simultaneously used for uplink transmission, the physical antennas indicated in the antenna capability reporting information to obtain physical antennas that are supported by the communications apparatus and that are simultaneously used for uplink transmission, where the quantity of physical antennas is indicated in the antenna capability reporting information. Alternatively, the network device combines, based on a quantity of physical antennas that are supported by the communications apparatus and that are simultaneously used for uplink transmission, physical antennas indicated in the antenna capability reporting information to obtain physical antennas that are not supported by the communications apparatus and that are simultaneously used for uplink transmission, and further determines a physical antenna that is supported by the communications apparatus and that is simultaneously used for uplink transmission, where the quantity of physical antennas is indicated in the antenna capability reporting information.

For example, when the communications apparatus supports 2T4R, the antenna capability reporting information includes index information of a physical antenna, for example, includes the indication information of the index of the physical antenna 0, the indication information of the index of the physical antenna 2, and the indication information of the index of the physical antenna 3. The network device determines, based on a quantity, 2, indicated in the antenna capability reporting information, of physical antennas that are supported by the communications apparatus and that are simultaneously used for uplink transmission, a physical antenna that is supported by the communications apparatus and that is simultaneously used for uplink transmission: the physical antenna 0, the physical antenna 2, the physical antenna 3, the physical antenna 0 and the physical antenna 3, the physical antenna 0 and the physical antenna 2, or the physical antenna 2 and the physical antenna 3. In this case, although the quantity of physical antennas that are supported by the communications apparatus and that are simultaneously used for uplink transmission is 2, only one physical antenna may be used for uplink transmission. Therefore, the physical antenna 0, the physical antenna 2, or the physical antenna 3 may also be determined.

A person skilled in the art should understand that the physical antenna that is supported by the communications apparatus and that is simultaneously used for uplink transmission is determined based on the quantity of physical antennas that are supported by the communications apparatus and that are simultaneously used for uplink transmission, and the indication information of the physical antenna group or the index of the physical antenna group that is supported by the communications apparatus and that is simultaneously used for uplink transmission, where the quantity of physical antennas and the indication information are indicated in the antenna capability reporting information.

According to the foregoing description of the antenna capability reporting information, after parsing the antenna capability reporting information, the network device may learn of the quantity of physical antennas included in the communications apparatus, or the physical antenna that is supported by the communications apparatus and that is simultaneously used for uplink transmission.

For step S204, after determining the quantity of layers for uplink transmission and the antenna capability of the communications apparatus, the network device may determine the precoding matrix used for uplink information coding.

Before a method for determining the second target precoding matrix is described, a codebook in this embodiment of this application is first described.

In this embodiment, each quantity of layers for uplink transmission corresponds to a plurality of codebooks, and each of the plurality of codebooks corresponding to a same quantity of layers corresponds to the antenna capability supported by the communications apparatus.

The following describes a partial codebook corresponding to a communications apparatus having N physical antennas.

At least some precoding matrices (referred to as first precoding matrices) in the codebook satisfies the following rules: The first precoding matrix satisfies a preset condition, and the preset condition is $$W^T W = \begin{bmatrix} D_{11} & 0 \\ 0 & D_{12} \end{bmatrix},$$

or the preset condition is $$W^T W = \begin{bmatrix} 0 & D_{12} \\ D_{21} & 0 \end{bmatrix}.$$

W is the first precoding matrix, $W^T$ is a conjugate transpose matrix of the first precoding matrix, $$\begin{bmatrix} D_{11} & 0 \\ 0 & D_{12} \end{bmatrix}$$

is a diagonal matrix, and $$\begin{bmatrix} 0 & D_{12} \\ D_{21} & 0 \end{bmatrix}$$

is a diagonal matrix.

In addition, the first precoding matrix has the following features:

(1) A quantity of rows of the first precoding matrix is the same as the quantity of physical antennas of the communications apparatus, that is, N rows. The rows of the first precoding matrix are in a one-to-one correspondence with the physical antennas of the communications apparatus. For example, N=4, four physical antennas are respectively a physical antenna 0, a physical antenna 1, and a physical antenna 2, and a physical antenna 3, the first row may correspond to the physical antenna 0, the second row may correspond to the physical antenna 1, the third row may correspond to the physical antenna 2, and the fourth row may correspond to the physical antenna 3.

A person skilled in the art should understand that herein for a specific physical antenna to which each row corresponds, an impulse response of a corresponding column in an uplink channel matrix is obtained based on an SRS transmitted by using the physical antenna.

(2) A physical antenna corresponding to a row that includes a non-zero element in the first precoding matrix is a physical antenna used to send uplink information. For example, the first precoding matrix is $$\begin{bmatrix} 1 \\ 0 \\ 0 \\ 0 \end{bmatrix}.$$

As described in (1), a communications apparatus corresponding to the first precoding matrix has four physical antennas, and the quantity of layers for uplink transmission is 1. As described in (2), the first row may correspond to the physical antenna 0, and because all rows that include a non-zero element in the first precoding matrix are the first row, a physical antenna indicated by the first precoding matrix is the physical antenna 0.

For another example, the first precoding matrix is $$\frac{1}{\sqrt{2}} \begin{bmatrix} 0 & 0 \\ 1 & 0 \\ 0 & 0 \\ 0 & 1 \end{bmatrix}.$$

As described in (1), a communications apparatus corresponding to the first precoding matrix has four physical antennas, and the quantity of layers for uplink transmission is 2. As described in (2), the second row may correspond to the physical antenna 1, and the fourth row may correspond to the physical antenna 3. Because all rows that include a non-zero element in the first precoding matrix are the second row and the fourth row, physical antennas indicated by the first precoding matrix are the physical antenna 1 and the physical antenna 3.

(3) A quantity of rows that include a non-zero element and that are in the first precoding matrix is greater than or equal to 1 and less than or equal to the quantity of physical antennas that are supported by the communications apparatus and that are simultaneously used for uplink transmission. For example, if the antenna capability supported by the communications apparatus is 2T4R, the quantity of antennas that can be supported by the communications apparatus and that are used to send uplink information at a same moment is 2.

(4) A quantity of columns in the first precoding matrix is the same as the quantity of layers for uplink transmission.

(5) Vectors of columns in the first precoding matrix are orthogonal to each other.

In this case, when the quantity of layers for uplink transmission is 1 and the quantity of physical antennas of the communications apparatus is 4, a codebook corresponding to uplink transmission may be that shown in Table 1.

TABLE 1

| | | | | |
|---|---|---|---|---|
| 0 to 3 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ |
| 4 to 7 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 to 11 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| 12 to 15 | $\frac{1}{2}\begin{bmatrix}1\\1\\0\\0\end{bmatrix}$ | $\frac{1}{2}\begin{bmatrix}1\\-1\\0\\0\end{bmatrix}$ | $\frac{1}{2}\begin{bmatrix}1\\j\\0\\0\end{bmatrix}$ | $\frac{1}{2}\begin{bmatrix}1\\-j\\0\\0\end{bmatrix}$ |

TABLE 1-continued

| | | | | |
|---|---|---|---|---|
| 16 to 19 | $\frac{1}{2}\begin{bmatrix}0\\0\\1\\1\end{bmatrix}$ | $\frac{1}{2}\begin{bmatrix}0\\0\\1\\-1\end{bmatrix}$ | $\frac{1}{2}\begin{bmatrix}0\\0\\1\\j\end{bmatrix}$ | $\frac{1}{2}\begin{bmatrix}0\\0\\1\\-j\end{bmatrix}$ |
| 20 to 23 | $\frac{1}{2}\begin{bmatrix}0\\1\\1\\0\end{bmatrix}$ | $\frac{1}{2}\begin{bmatrix}0\\1\\-1\\0\end{bmatrix}$ | $\frac{1}{2}\begin{bmatrix}0\\1\\j\\0\end{bmatrix}$ | $\frac{1}{2}\begin{bmatrix}0\\1\\-j\\0\end{bmatrix}$ |
| 24 to 27 | $\frac{1}{2}\begin{bmatrix}1\\0\\0\\1\end{bmatrix}$ | $\frac{1}{2}\begin{bmatrix}1\\0\\0\\-1\end{bmatrix}$ | $\frac{1}{2}\begin{bmatrix}1\\0\\0\\j\end{bmatrix}$ | $\frac{1}{2}\begin{bmatrix}1\\0\\0\\-j\end{bmatrix}$ |

All precoding matrices in the codebook shown in Table 1 are first precoding matrices that satisfy the foregoing conditions. Referring to Table 1, the first column in Table 1 is an index of a precoding matrix, and indexes corresponding to first precoding matrices in a same row increase from left to right. For example, an index of $$\frac{1}{2}\begin{bmatrix}1\\0\\0\\0\end{bmatrix}$$

is 0, and an index of $$\frac{1}{2}\begin{bmatrix}0\\1\\0\\0\end{bmatrix}$$

is 1.

According to the codebook design method in Table 1, all physical antennas included in the communications apparatus equally share power. However, in an actual case, not all antennas simultaneously send uplink information. Consequently, power of an antenna that actually sends uplink information is not high if all the physical antennas equally share power, and this is not conducive to effective sending of the uplink information.

Therefore, to ensure that a sum of energy allocated to the physical antennas simultaneously used to send uplink information is 1, rather than that all the antennas equally share power, to ensure effective sending of the uplink information, the first precoding matrix may further satisfy the following condition:

(6) A normalization coefficient of the first precoding matrix is a reciprocal of a square root of a sum of squares of non-zero elements in the first precoding matrix. In this case, when the quantity of layers for uplink transmission is 1 and the communications apparatus has four physical antennas, a codebook corresponding to uplink transmission may be that shown in Table 2.

TABLE 2

| | | | | |
|---|---|---|---|---|
| 0 to 3 | $\begin{bmatrix}1\\0\\0\\0\end{bmatrix}$ | $\begin{bmatrix}0\\1\\0\\0\end{bmatrix}$ | $\begin{bmatrix}0\\0\\1\\0\end{bmatrix}$ | $\begin{bmatrix}0\\0\\0\\1\end{bmatrix}$ |
| 4 to 7 | $\frac{1}{\sqrt{2}}\begin{bmatrix}1\\0\\1\\0\end{bmatrix}$ | $\frac{1}{\sqrt{2}}\begin{bmatrix}1\\0\\-1\\0\end{bmatrix}$ | $\frac{1}{\sqrt{2}}\begin{bmatrix}1\\0\\j\\0\end{bmatrix}$ | $\frac{1}{\sqrt{2}}\begin{bmatrix}1\\0\\-j\\0\end{bmatrix}$ |
| 8 to 11 | $\frac{1}{\sqrt{2}}\begin{bmatrix}0\\1\\0\\1\end{bmatrix}$ | $\frac{1}{\sqrt{2}}\begin{bmatrix}0\\1\\0\\-1\end{bmatrix}$ | $\frac{1}{\sqrt{2}}\begin{bmatrix}0\\1\\0\\j\end{bmatrix}$ | $\frac{1}{\sqrt{2}}\begin{bmatrix}0\\1\\0\\-j\end{bmatrix}$ |
| 12 to 15 | $\frac{1}{\sqrt{2}}\begin{bmatrix}1\\1\\0\\0\end{bmatrix}$ | $\frac{1}{\sqrt{2}}\begin{bmatrix}1\\-1\\0\\0\end{bmatrix}$ | $\frac{1}{\sqrt{2}}\begin{bmatrix}1\\j\\0\\0\end{bmatrix}$ | $\frac{1}{\sqrt{2}}\begin{bmatrix}1\\-j\\0\\0\end{bmatrix}$ |
| 16 to 19 | $\frac{1}{\sqrt{2}}\begin{bmatrix}0\\0\\1\\1\end{bmatrix}$ | $\frac{1}{\sqrt{2}}\begin{bmatrix}0\\0\\1\\-1\end{bmatrix}$ | $\frac{1}{\sqrt{2}}\begin{bmatrix}0\\0\\1\\j\end{bmatrix}$ | $\frac{1}{\sqrt{2}}\begin{bmatrix}0\\0\\1\\-j\end{bmatrix}$ |
| 20 to 23 | $\frac{1}{\sqrt{2}}\begin{bmatrix}0\\1\\1\\0\end{bmatrix}$ | $\frac{1}{\sqrt{2}}\begin{bmatrix}0\\1\\-1\\0\end{bmatrix}$ | $\frac{1}{\sqrt{2}}\begin{bmatrix}0\\1\\j\\0\end{bmatrix}$ | $\frac{1}{\sqrt{2}}\begin{bmatrix}0\\1\\-j\\0\end{bmatrix}$ |
| 24 to 27 | $\frac{1}{\sqrt{2}}\begin{bmatrix}1\\0\\0\\1\end{bmatrix}$ | $\frac{1}{\sqrt{2}}\begin{bmatrix}1\\0\\0\\-1\end{bmatrix}$ | $\frac{1}{\sqrt{2}}\begin{bmatrix}1\\0\\0\\j\end{bmatrix}$ | $\frac{1}{\sqrt{2}}\begin{bmatrix}1\\0\\0\\-j\end{bmatrix}$ |

When the quantity of layers for uplink transmission is 1, the communications apparatus has four physical antennas, and the first precoding matrices satisfies the conditions (1) to (6), a codebook corresponding to uplink transmission may alternatively be that shown in Table 3.

TABLE 3

| | | | | | | | | |
|---|---|---|---|---|---|---|---|---|
| 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |

TABLE 3-continued

| 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| --- | --- | --- | --- | --- | --- | --- | --- | --- |
| 16 to 23 | $\frac{1}{\sqrt{2}}\begin{bmatrix}1\\0\\1\\0\end{bmatrix}$ | $\frac{1}{\sqrt{2}}\begin{bmatrix}1\\0\\-1\\0\end{bmatrix}$ | $\frac{1}{\sqrt{2}}\begin{bmatrix}1\\0\\j\\0\end{bmatrix}$ | $\frac{1}{\sqrt{2}}\begin{bmatrix}1\\0\\-j\\0\end{bmatrix}$ | $\frac{1}{\sqrt{2}}\begin{bmatrix}0\\1\\0\\1\end{bmatrix}$ | $\frac{1}{\sqrt{2}}\begin{bmatrix}0\\1\\0\\-1\end{bmatrix}$ | $\frac{1}{\sqrt{2}}\begin{bmatrix}0\\1\\0\\j\end{bmatrix}$ | $\frac{1}{\sqrt{2}}\begin{bmatrix}0\\1\\0\\-j\end{bmatrix}$ |
| 24 to 31 | $\begin{bmatrix}1\\0\\0\\0\end{bmatrix}$ | $\begin{bmatrix}0\\1\\0\\0\end{bmatrix}$ | $\begin{bmatrix}0\\0\\1\\0\end{bmatrix}$ | $\begin{bmatrix}0\\0\\0\\1\end{bmatrix}$ | $\frac{1}{\sqrt{2}}\begin{bmatrix}1\\1\\0\\0\end{bmatrix}$ | $\frac{1}{\sqrt{2}}\begin{bmatrix}1\\-1\\0\\0\end{bmatrix}$ | $\frac{1}{\sqrt{2}}\begin{bmatrix}1\\j\\0\\0\end{bmatrix}$ | $\frac{1}{\sqrt{2}}\begin{bmatrix}1\\-j\\0\\0\end{bmatrix}$ |
| 32 to 39 | $\frac{1}{\sqrt{2}}\begin{bmatrix}0\\0\\1\\1\end{bmatrix}$ | $\frac{1}{\sqrt{2}}\begin{bmatrix}0\\0\\1\\-1\end{bmatrix}$ | $\frac{1}{\sqrt{2}}\begin{bmatrix}0\\0\\1\\j\end{bmatrix}$ | $\frac{1}{\sqrt{2}}\begin{bmatrix}0\\0\\1\\-j\end{bmatrix}$ | $\frac{1}{\sqrt{2}}\begin{bmatrix}0\\1\\1\\0\end{bmatrix}$ | $\frac{1}{\sqrt{2}}\begin{bmatrix}0\\1\\-1\\0\end{bmatrix}$ | $\frac{1}{\sqrt{2}}\begin{bmatrix}0\\1\\j\\0\end{bmatrix}$ | $\frac{1}{\sqrt{2}}\begin{bmatrix}0\\1\\-j\\0\end{bmatrix}$ |
| 40 to 43 | $\frac{1}{\sqrt{2}}\begin{bmatrix}1\\0\\0\\1\end{bmatrix}$ | $\frac{1}{\sqrt{2}}\begin{bmatrix}1\\0\\0\\-1\end{bmatrix}$ | $\frac{1}{\sqrt{2}}\begin{bmatrix}1\\0\\0\\j\end{bmatrix}$ | $\frac{1}{\sqrt{2}}\begin{bmatrix}1\\0\\0\\-j\end{bmatrix}$ | | | | |

In the codebook shown in Table 3, the precoding matrices corresponding to the indexes 16 to 43 are all first precoding matrices that satisfy the foregoing conditions, and the precoding matrices corresponding to the indexes 0 to 15 are precoding matrices in the prior art. Referring to Table 3, indexes corresponding to first precoding matrices in a same row increase from left to right. For example, an index of $$\begin{bmatrix}1\\0\\0\\0\end{bmatrix}$$

is 24, and an index of $$\begin{bmatrix}0\\1\\0\\0\end{bmatrix}$$

is 25.

When the quantity of layers for uplink transmission is 2, the communications apparatus has four physical antennas, and the first precoding matrices satisfy the conditions (1) to (6), a codebook corresponding to uplink transmission may be that shown in Table 4 or Table 5.

TABLE 4

| 0 to 2 | $\frac{1}{\sqrt{2}}\begin{bmatrix}1 & 0\\0 & 0\\0 & 1\\0 & 0\end{bmatrix}$ | $\frac{1}{2}\begin{bmatrix}1 & 1\\0 & 0\\1 & -1\\0 & 0\end{bmatrix}$ | $\frac{1}{2}\begin{bmatrix}1 & 1\\0 & 0\\j & -j\\0 & 0\end{bmatrix}$ |
| --- | --- | --- | --- |
| 3 to 5 | $\frac{1}{\sqrt{2}}\begin{bmatrix}0 & 0\\1 & 0\\0 & 0\\0 & 1\end{bmatrix}$ | $\frac{1}{2}\begin{bmatrix}0 & 0\\1 & 1\\0 & 0\\1 & -1\end{bmatrix}$ | $\frac{1}{2}\begin{bmatrix}0 & 0\\1 & 1\\0 & 0\\j & -j\end{bmatrix}$ |
| 6 to 8 | $\frac{1}{\sqrt{2}}\begin{bmatrix}1 & 0\\0 & 1\\0 & 0\\0 & 0\end{bmatrix}$ | $\frac{1}{2}\begin{bmatrix}1 & 1\\1 & -1\\0 & 0\\0 & 0\end{bmatrix}$ | $\frac{1}{2}\begin{bmatrix}1 & 1\\j & -j\\0 & 0\\0 & 0\end{bmatrix}$ |
| 9 to 11 | $\frac{1}{\sqrt{2}}\begin{bmatrix}0 & 0\\0 & 0\\1 & 0\\0 & 1\end{bmatrix}$ | $\frac{1}{2}\begin{bmatrix}0 & 0\\0 & 0\\1 & 1\\1 & -1\end{bmatrix}$ | $\frac{1}{2}\begin{bmatrix}0 & 0\\0 & 0\\1 & 1\\j & -j\end{bmatrix}$ |
| 12 to 14 | $\frac{1}{\sqrt{2}}\begin{bmatrix}0 & 0\\1 & 0\\0 & 1\\0 & 0\end{bmatrix}$ | $\frac{1}{2}\begin{bmatrix}0 & 0\\1 & 1\\1 & -1\\0 & 0\end{bmatrix}$ | $\frac{1}{2}\begin{bmatrix}0 & 0\\1 & 1\\j & -j\\0 & 0\end{bmatrix}$ |
| 15 to 17 | $\frac{1}{\sqrt{2}}\begin{bmatrix}1 & 0\\0 & 0\\0 & 0\\0 & 1\end{bmatrix}$ | $\frac{1}{2}\begin{bmatrix}1 & 1\\0 & 0\\0 & 0\\1 & -1\end{bmatrix}$ | $\frac{1}{2}\begin{bmatrix}1 & 1\\0 & 0\\0 & 0\\j & -j\end{bmatrix}$ |

TABLE 5

| Indexes | | | | |
|---|---|---|---|---|
| 0 to 3 | $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| 4 to 7 | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ |
| 8 to 11 | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ |
| 12 to 15 | $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ |
| 16 to 18 | $\frac{1}{\sqrt{2}}\begin{bmatrix}1&0\\0&0\\0&1\\0&0\end{bmatrix}$ | $\frac{1}{2}\begin{bmatrix}1&1\\0&0\\1&-1\\0&0\end{bmatrix}$ | $\frac{1}{2}\begin{bmatrix}1&1\\0&0\\j&-j\\0&0\end{bmatrix}$ | |
| 19 to 21 | $\frac{1}{\sqrt{2}}\begin{bmatrix}0&0\\1&0\\0&0\\0&1\end{bmatrix}$ | $\frac{1}{2}\begin{bmatrix}0&0\\1&1\\0&0\\1&-1\end{bmatrix}$ | $\frac{1}{2}\begin{bmatrix}0&0\\1&1\\0&0\\j&-j\end{bmatrix}$ | |
| 22 to 24 | $\frac{1}{\sqrt{2}}\begin{bmatrix}1&0\\0&1\\0&0\\0&0\end{bmatrix}$ | $\frac{1}{2}\begin{bmatrix}1&1\\1&-1\\0&0\\0&0\end{bmatrix}$ | $\frac{1}{2}\begin{bmatrix}1&1\\j&-j\\0&0\\0&0\end{bmatrix}$ | |
| 25 to 27 | $\frac{1}{\sqrt{2}}\begin{bmatrix}0&0\\0&0\\1&0\\0&1\end{bmatrix}$ | $\frac{1}{2}\begin{bmatrix}0&0\\0&0\\1&1\\1&-1\end{bmatrix}$ | $\frac{1}{2}\begin{bmatrix}0&0\\0&0\\1&1\\j&-j\end{bmatrix}$ | |
| 28 to 30 | $\frac{1}{\sqrt{2}}\begin{bmatrix}0&0\\1&0\\0&1\\0&0\end{bmatrix}$ | $\frac{1}{2}\begin{bmatrix}0&0\\1&1\\1&-1\\0&0\end{bmatrix}$ | $\frac{1}{2}\begin{bmatrix}0&0\\1&1\\j&-j\\0&0\end{bmatrix}$ | |
| 31 to 33 | $\frac{1}{\sqrt{2}}\begin{bmatrix}1&0\\0&0\\0&0\\0&1\end{bmatrix}$ | $\frac{1}{2}\begin{bmatrix}1&1\\0&0\\0&0\\1&-1\end{bmatrix}$ | $\frac{1}{2}\begin{bmatrix}1&1\\0&0\\0&0\\j&-j\end{bmatrix}$ | |

All the precoding matrices in the codebook shown in Table 4 are first precoding matrices that satisfy the conditions (1) to (6). Referring to Table 4, indexes corresponding to first precoding matrices in a same row increase from left to right. For example, an index of $$\frac{1}{\sqrt{2}}\begin{bmatrix}1&0\\0&0\\0&1\\0&0\end{bmatrix}$$

is 0, and an index of $$\frac{1}{2}\begin{bmatrix}1&1\\0&0\\1&-1\\0&0\end{bmatrix}$$

is 1.

In the codebook shown in Table 5, the precoding matrices corresponding to the indexes 16 to 33 are all first precoding matrices that satisfy the conditions (1) to (6), and the precoding matrices corresponding to the indexes 0 to 15 are precoding matrices in the prior art. In other words, the codebook shown in Table 5 includes a plurality of first precoding matrices that are not in a codebook in the prior art and that satisfy the foregoing conditions. Referring to Table 5, indexes corresponding to first precoding matrices in a same row increase from left to right. For example, an index of $$\frac{1}{\sqrt{2}}\begin{bmatrix}1&0\\0&0\\0&1\\0&0\end{bmatrix}$$

is 16, and an index of $$\frac{1}{2}\begin{bmatrix}1&1\\0&0\\1&-1\\0&0\end{bmatrix}$$

is 17.

A person skilled in the art may understand that, if the quantity of physical antennas included in the communications apparatus is 8, and the quantity of layers for uplink transmission is 1, the first precoding matrix in a corresponding codebook has eight rows and one column; and if the quantity of physical antennas of the communications apparatus is 2, and the quantity of layers for uplink transmission is 1, the first precoding matrix in a corresponding codebook has two rows and one column. In other words, a same quantity of layers for uplink transmission corresponds to a plurality of different codebooks based on different quantities of physical antennas included in the terminal.

A person skilled in the art should understand that the foregoing codebooks are stored in both the communications apparatus and the network device, and only one form of codebooks corresponding to a same quantity of layers and a same quantity of physical antennas is stored. For example, if codebooks stored on the communications apparatus side and the network device side are the codebook shown in Table 2, the codebook shown in Table 3 is not stored. If codebooks stored on the communications apparatus side and the network device side are the codebook shown in Table 3, the codebook shown in Table 2 is not stored.

In addition, a person skilled in the art may understand that each precoding matrix corresponds to one index, and the indexes of the precoding matrices in the foregoing tables are used as an example, and are not limited to the indexes in the foregoing tables. Indexes of precoding matrices included in one codebook may be defined in a standard, or may be determined through negotiation by the communications apparatus and the network device.

It can be learned from the foregoing description that the first precoding matrix can indicate the physical antenna of the communications apparatus. The following describes a reason why the first precoding matrix can indicate the physical antenna of the terminal, and can be further used to cancel inter-channel interference as a precoding matrix in the prior art is used to cancel inter-channel interference.

First, a principle of obtaining a precoding matrix in the prior art is described.

A method for calculating a vector of a signal received by a receive end is shown in Formula 1:

$$r = Hs + n \qquad \text{Formula 1}$$

r, H, s, and n represent a received signal vector, a channel matrix, a sent signal vector, and an additive noise vector, respectively.

If $$H = \begin{bmatrix} h_{11} & h_{12} \\ h_{21} & h_{22} \end{bmatrix}$$

(a channel matrix corresponding to two physical antennas at a transmit end and two physical antennas at the receive end), $$s = \begin{bmatrix} x_1 \\ x_2 \end{bmatrix}, \text{ and } n = \begin{bmatrix} n_1 \\ n_2 \end{bmatrix},$$

$$r = \begin{bmatrix} h_{11} \times x_1 + h_{12} \times x_2 + n_1 \\ h_{21} \times x_1 + h_{22} \times x_2 + n_2 \end{bmatrix}.$$

To be specific, signals $r_1$ received by the first antenna at the receive end include a signal obtained after a signal $x_1$ sent by the first antenna at the transmit end passes through a channel $h_{11}$ and a signal obtained after a signal $x_2$ sent by the second antenna passes through a channel $h_{12}$; signals received by the second antenna at the receive end include both a signal obtained after the signal $x_2$ sent by the second antenna at the transmit end passes through a channel $h_{22}$ and a signal obtained after the signal $x_1$ sent by the first antenna passes through a channel $h_{21}$. Inter-channel interference or inter-signal interference is strong.

If the channel matrix is a diagonal matrix, for example, $$H' = \begin{bmatrix} h_{11} & 0 \\ 0 & h_{22} \end{bmatrix},$$

a received signal vector of a sent signal that reaches the receive end through a channel is $$r' = \begin{bmatrix} r'_1 \\ r'_i \end{bmatrix} = \begin{bmatrix} h_{11} \times x_1 + n_1 \\ h_{22} \times x_2 + n_2 \end{bmatrix}.$$

The signals $r_1$ received by the first antenna of the receive end do not include the signal obtained after the signal $x_2$ sent by the second antenna passes through the channel $h_{12}$; the signals received by the second antenna at the receive end does not include the signal obtained after the signal $x_1$ sent by the first antenna passes through the channel $h_{21}$. In other words, inter-channel interference or inter-signal interference is eliminated. However, a MIMO channel matrix does not have a feature of the diagonal matrix.

A left singular matrix U, a diagonal matrix S, and a right singular matrix V are obtained by performing singular value decomposition (SVD for short) on the channel matrix H: SVD (SVD) on the channel matrix H. The matrix U and the matrix V are both unitary matrices. A result of multiplying a unitary matrix by a conjugate transpose matrix of the unitary matrix is a unit matrix, that is, $U^H U = UU^H = V^H V = VV^H = I$. If a to-be-sent signal is preprocessed before the to-be-sent signal passes through a channel, that is, the to-be-sent signal is left-multiplied by a precoding matrix W, where the precoding matrix W is a conjugate transpose matrix $V^H$ of the right singular matrix V of the channel matrix H. The precoded signal then passes through a channel, the receive end receives a signal $$r = HWx + n = USVV^H x + n = \begin{bmatrix} U_{11} & U_{12} \\ U_{21} & U_{22} \end{bmatrix} \begin{bmatrix} S_{11} & 0 \\ 0 & S_{22} \end{bmatrix} \begin{bmatrix} x_1 \\ x_2 \end{bmatrix} + n,$$

and the receive end left-multiplies the received signal by a conjugate transpose matrix of the unitary matrix U, that is, $$U^H r = U^H USx + n = Sx + n = \begin{bmatrix} S_{11} & 0 \\ 0 & S_{22} \end{bmatrix} \begin{bmatrix} x_1 \\ x_2 \end{bmatrix} + n.$$

This is equivalent to directly multiplying a sent signal by a diagonal matrix. Therefore, a precoded signal that has pass through a spatial channel is equivalent to a set of data that does not interfere with each other, thereby avoiding inter-channel interference or inter-signal interference.

Therefore, an ideal precoding matrix is the conjugate transpose matrix $V^H$ of the right singular matrix V of the channel matrix. However, because complete and accurate channel information is of a large data volume, a large quantity of downlink resources are occupied when the network device notifies the communications apparatus of an uplink channel. Therefore, to reduce overheads, Vin various forms is compressed, quantized, and numbered by using a codebook-based precoding technology, to obtain precoding matrices in the prior art, for example, the precoding matrices indicated by the indexes 0 to 15 in Table 3, precoding matrices obtained after coefficients of the precoding matrices indicated by the indexes 16 to 23 are changed to ½, and the precoding matrices indicated by 0 to 15 in Table 5. The precoding matrices in the prior art also satisfy the following condition: A diagonal matrix can be obtained after a conjugate transpose matrix of a precoding matrix is multiplied by the precoding matrix.

Then, a reason why the first precoding matrix in this embodiment can indicate a physical antenna and can also cancel inter-channel interference is described.

Compared with the precoding matrices in the prior art, in this embodiment of this application, a precoding matrix that can indicate a physical antenna is implemented in the following manner: A non-zero element in some rows in the precoding matrices in the prior art is set to 0, so that elements in some rows are all 0-elements. In this way, a physical antenna can be indicated. After a channel matrix is multiplied by a precoding matrix $W_1$ in the prior art, and then is left-multiplied by the conjugate transposed matrix of the left singular matrix U, calculating, by the receive end, a received signal of the receive end is equivalent to directly multiplying a sent signal by a first diagonal matrix, that is, a signal precoded by using the precoding matrix $W_1$ after passing through a spatial channel can be equivalent to a group of data that does not interfere with each other. In this case, according to a matrix multiplication principle, a non-zero element in some rows in the precoding matrices in the prior art is set to 0, so that the first precoding matrix $W_1$ that can indicate a physical antenna and that is obtained after the elements in the some rows are all 0-elements also satisfies the following condition: After a channel matrix is multiplied by a first precoding matrix $W_2$, and then is left-multiplied by the conjugate transposed matrix of the left singular matrix U, calculating, by the receive end, a received signal of the receive end is equivalent to directly multiplying a sent signal by a second diagonal matrix, that is, a signal precoded by using the precoding matrix $W_2$ after passing through a spatial channel can be equivalent to a group of data that does not interfere with each other. However, there is definitely a 0-element in the foregoing second diagonal matrix.

In an actual process, a precoding matrix in an ideal case (which is the conjugate transpose matrix $V^H$ of the right singular matrix V of the channel matrix) does not exist, and an existing precoding matrix obtained after compression and quantization can eliminate inter-channel interference only as much as possible. Similarly, according to the matrix multiplication principle, a non-zero element in some rows in a precoding matrix in the prior art is set to 0, so that an effect of canceling inter-channel interference achieved by multiplying a first precoding matrix obtained after elements of some rows are all set to 0-elements by an uplink signal, and then left-multiplying by the conjugate transpose matrix of the left singular matrix U and the channel matrix, is the same as an effect of an existing precoding matrix.

Based on the foregoing description of the codebook in this embodiment, the following describes the method for determining the second target precoding matrix in step S204 in this embodiment of this application.

Before the second target precoding matrix is determined, the second target codebook needs to be first determined.

The method for determining the second target codebook may have the following two implementable implementations:

In a first implementable implementation, a first codebook that is stored in the network device and that corresponds to the quantity of layers for uplink transmission and the quantity of physical antennas included in the communications apparatus, namely, the codebook originally stored on the network device side, is obtained, and the first codebook is determined as the second target codebook.

For example, if the quantity of layers for uplink transmission is 1, and after the network device parses the antenna capability reporting information, the network device learns that the communications apparatus has four physical antennas, the network device selects a codebook corresponding to the quantity of layers for transmission that is 1, and the quantity of physical antennas of the communications apparatus that is 4 as the second target codebook. In this case, the second target codebook may be a codebook shown in Table 2. If the quantity of layers for uplink transmission is 2, and after parsing the antenna capability reporting information, the network device learns that the communications apparatus has four antennas, the network device selects a codebook corresponding to the quantity of layers for uplink transmission that is 2, and the quantity of physical antennas of the communications apparatus that is 4 as the second target codebook. In this case, the second target codebook may be a codebook shown in Table 4.

In a second implementable implementation, a first codebook that is stored in the network device and that corresponds to the quantity of layers for uplink transmission and the quantity of physical antennas included in the communications apparatus, namely, the codebook originally stored on the network device side, is obtained; and the network device obtains the second target codebook based on the antenna capability of the communications apparatus or the uplink channel information, and the first codebook. The second target codebook is a subset of the first codebook.

That the network device obtains the second target codebook based on the antenna capability of the communications apparatus or the uplink channel information may be understood as follows: (1) The network device obtains the second target codebook based only on the antenna capability of the communications apparatus. (2) The network device obtains the second target codebook based only on the uplink channel information. (3) The network device obtains the second target codebook based on the antenna capability of the communications apparatus and the uplink channel information.

Specifically, the network device obtains, based on the antenna capability of the communications apparatus or the uplink channel information, a plurality of second precoding matrices that are in the first codebook and that form the second target codebook (that is, precoding matrices unrestricted to be selected by the communications apparatus); and obtains the second target codebook based on the plurality of second precoding matrices. Herein, the obtaining the second target codebook may be understood as extracting a plurality of second precoding matrices from the first codebook, so that a second target codebook that is reduced relative to the first codebook is obtained (in this case, an index of the second precoding matrix in the first codebook may be different from an index of the second precoding matrix in the second codebook). The obtaining the second target codebook herein may also be understood as: marking a plurality of second precoding matrices in the first codebook as unrestricted to be selected by the communications apparatus, or marking precoding matrices other than a plurality of second precoding matrices in the first codebook as restricted to be selected by the communications apparatus. This is equivalent to obtaining a codebook with a mark of being restricted to be selected by the communications apparatus or a mark of being unrestricted to be selected by the communications apparatus (in this case, an index of the second precoding matrix in the first codebook is the same as an index of the second precoding matrix in the second target codebook).

Specifically, the method for obtaining the second target codebook has the following five implementable manners shown in a to e.

Specifically: a. Determining, by the network device based on the quantity of physical antennas that are supported by the communications apparatus and that are simultaneously used for uplink transmission, a plurality of second precoding matrices that are in the first codebook and that are unrestricted to be selected by the terminal is specifically: determining a plurality of first precoding matrices that can indicate the quantity of physical antennas as the plurality of second precoding matrices. It may be understood that the antenna capability indicated in the antenna capability reporting information corresponding to the method further includes at least the quantity of physical antennas that are supported by the communications apparatus and that are simultaneously used for uplink transmission.

For example, if the first codebook is a codebook shown in Table 3, the network device learns, based on the antenna capability reporting information, that the quantity of physical antennas that are supported by the communications apparatus and that are simultaneously used for uplink transmission is 1, precoding matrices $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \text{ and } \begin{bmatrix} 0 \\ 0 \\ 0 \\ 1 \end{bmatrix}$$

in the codebook shown in Table 3 each include one row of non-zero element which indicates one physical antenna, $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \text{ and } \begin{bmatrix} 0 \\ 0 \\ 0 \\ 1 \end{bmatrix}$$

are determined as the plurality of second precoding matrices. In this case, the second target codebook may be that shown in Table 6.

TABLE 6

| 0 to 3 | $\begin{bmatrix} 1 \\ 0 \\ 0 \\ 0 \end{bmatrix}$ | $\begin{bmatrix} 0 \\ 1 \\ 0 \\ 0 \end{bmatrix}$ | $\begin{bmatrix} 0 \\ 0 \\ 1 \\ 0 \end{bmatrix}$ | $\begin{bmatrix} 0 \\ 0 \\ 0 \\ 1 \end{bmatrix}$ |
|---|---|---|---|---|

All the precoding matrices indicated by the indexes 0 to 15 in the original first codebook shown in Table 3 are existing precoding matrices, and cannot indicate antennas. All the precoding matrices indicated by the indexes 16 to 23 and 28 to 43 can indicate two physical antennas. In this case, the precoding matrices indicated by the indexes 0 to 15, 16 to 23, and 28 to 43 are all precoding matrices restricted to be selected by the terminal, and may be referred to as third precoding matrices. It can be learned from Table 6 that an index of a second precoding matrix in the codebook shown in Table 6 in the codebook shown in Table 3 is different from an index of the second precoding matrix in the codebook shown in Table 6.

It may be understood that a form of the second target codebook shown in Table 6 is a newly obtained reduced codebook. In this case, the second target codebook may not be in the form shown in Table 6. For example, the second target codebook may still be in the form shown in Table 3, and only the precoding matrices indicated by the indexes 0 to 15, 16 to 23, and 28 to 43 have a mark of being restricted to be selected by the communications apparatus, or precoding matrices indicated by the indexes 24 to 27 have a mark of being unrestricted to be selected by the communications apparatus.

A process of determining the second target codebook by using the method is relatively simple.

b. The network device determines, based on the uplink channel information and the quantity of physical antennas that are supported by the communications apparatus and that are simultaneously used for uplink transmission, a plurality of second precoding matrices that are in the first codebook and that are unrestricted to be selected by the terminal. It may be understood that the antenna capability indicated in the antenna capability reporting information corresponding to the method further includes at least the quantity of physical antennas that are supported by the communications apparatus and that are simultaneously used for uplink transmission and the quantity of physical antennas of the communications apparatus.

For example, the first codebook is a codebook shown in Table 2; the network device learns, based on the antenna capability reporting information, that the quantity of physical antennas that are supported by the communications apparatus and that are simultaneously used for uplink transmission is 1; and precoding matrices $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \text{ and } \begin{bmatrix} 0 \\ 0 \\ 0 \\ 1 \end{bmatrix}$$

and in the codebook shown in Table 3 each include one row of non-zero element which indicates one physical antenna. However, based on previous experience, the network device may learn that system performance of an equivalent channel obtained based on $$\begin{bmatrix} 0 \\ 1 \\ 0 \\ 0 \end{bmatrix}$$

is poor, for example, a system capacity is less than a first preset threshold and/or an SINR is less than a second preset threshold, and in this case, $$\begin{bmatrix} 0 \\ 1 \\ 0 \\ 0 \end{bmatrix}$$

is removed from $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{and} \begin{bmatrix}0\\0\\0\\1\end{bmatrix},$$

to obtain $$\begin{bmatrix}1\\0\\0\\0\end{bmatrix}, \begin{bmatrix}0\\0\\1\\0\end{bmatrix}, \text{and} \begin{bmatrix}0\\0\\0\\1\end{bmatrix},$$

where $$\begin{bmatrix}1\\0\\0\\0\end{bmatrix}, \begin{bmatrix}0\\0\\1\\0\end{bmatrix}, \text{and} \begin{bmatrix}0\\0\\0\\1\end{bmatrix}$$

are the plurality of second precoding matrices.

In this case, the second target codebook may be that shown in Table 7.

TABLE 7

| 0 to 2 | $\begin{bmatrix}1\\0\\0\\0\end{bmatrix}$ | $\begin{bmatrix}0\\0\\1\\0\end{bmatrix}$ | $\begin{bmatrix}0\\0\\0\\1\end{bmatrix}$ |
|---|---|---|---|

All the precoding matrices indicated by the indexes 0 to 15 in the original first codebook shown in Table 3 are existing precoding matrices, and cannot indicate antennas. All the precoding matrices indicated by the indexes 16 to 23 and 28 to 43 can indicate two physical antennas. System performance of an equivalent channel obtained based on a precoding matrix indicated by the index 25 is poor. In this case, the precoding matrices indicated by the indexes 0 to 15, 16 to 23, 25, and 28 to 43 are all precoding matrices restricted to be selected by the terminal, and may be referred to as third precoding matrices. It can be learned from Table 7 that an index of a second precoding matrix in the codebook shown in Table 7 in the codebook shown in Table 3 is different from an index of the second precoding matrix in the codebook shown in Table 7.

It may be understood that a form of the second target codebook shown in Table 7 is a newly obtained reduced codebook. In this case, the second target codebook may not be in the form shown in Table 7. For example, the second target codebook may still be in the form shown in Table 3, and only the precoding matrices indicated by the indexes 0 to 15, 16 to 23, 25, and 28 to 43 have a mark of being restricted to be selected by the communications apparatus, or precoding matrices indicated by the indexes 24, 26, and 27 have a mark of being unrestricted to be selected by the communications apparatus.

In a process of determining the second target codebook by using the method, a target physical antenna that enables relatively desirable system performance can be selected to send uplink information.

c. Determining, by the network device based on the physical antenna that is supported by the communications apparatus and that is simultaneously used for uplink transmission, a plurality of second precoding matrices that are in the first codebook and that are unrestricted to be selected by the terminal is specifically: determining a plurality of precoding matrices that indicate the physical antennas that are supported by the communications apparatus and that are simultaneously used for uplink transmission as the plurality of second precoding matrices. It may be understood that the antenna capability indicated in the antenna capability reporting information corresponding to the method further includes at least the quantity of physical antennas that are supported by the communications apparatus and that are simultaneously used for uplink transmission and the physical antenna that is supported by the communications apparatus and that is simultaneously used for uplink transmission.

For example, if the first codebook is a codebook shown in Table 3, the network device learns, based on the antenna capability reporting information, that the communications apparatus may simultaneously send uplink information by using a physical antenna 0 and a physical antenna 2, simultaneously send uplink information by using a physical antenna 1 and a physical antenna 3, simultaneously send uplink information by using the physical antenna 0 and the physical antenna 3, and simultaneously send uplink information by using the physical antenna 1 and the physical antenna 2. In this case, $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \frac{1}{\sqrt{2}}\begin{bmatrix}1\\0\\-j\\0\end{bmatrix}, \frac{1}{\sqrt{2}}\begin{bmatrix}0\\1\\0\\1\end{bmatrix},$$

$$\frac{1}{\sqrt{2}}\begin{bmatrix}0\\1\\0\\-1\end{bmatrix}, \frac{1}{\sqrt{2}}\begin{bmatrix}0\\1\\0\\j\end{bmatrix}, \frac{1}{\sqrt{2}}\begin{bmatrix}0\\1\\0\\-j\end{bmatrix}, \frac{1}{\sqrt{2}}\begin{bmatrix}1\\0\\0\\1\end{bmatrix}, \frac{1}{\sqrt{2}}\begin{bmatrix}1\\0\\0\\-1\end{bmatrix},$$

$$\frac{1}{\sqrt{2}}\begin{bmatrix}1\\0\\0\\j\end{bmatrix}, \frac{1}{\sqrt{2}}\begin{bmatrix}1\\0\\0\\-j\end{bmatrix}, \frac{1}{\sqrt{2}}\begin{bmatrix}0\\1\\1\\0\end{bmatrix}, \frac{1}{\sqrt{2}}\begin{bmatrix}0\\1\\-1\\0\end{bmatrix}, \frac{1}{\sqrt{2}}\begin{bmatrix}0\\1\\j\\0\end{bmatrix}, \text{and}$$

$$\frac{1}{\sqrt{2}}\begin{bmatrix}0\\1\\-j\\0\end{bmatrix}$$

are the plurality of second precoding matrices. In this case, the second target codebook may be that shown in Table 8.

TABLE 8

| 0 to 7 | $\frac{1}{\sqrt{2}}\begin{bmatrix}1\\0\\1\\0\end{bmatrix}$ | $\frac{1}{\sqrt{2}}\begin{bmatrix}1\\0\\-1\\0\end{bmatrix}$ | $\frac{1}{\sqrt{2}}\begin{bmatrix}1\\0\\j\\0\end{bmatrix}$ | $\frac{1}{\sqrt{2}}\begin{bmatrix}1\\0\\-j\\0\end{bmatrix}$ | $\frac{1}{\sqrt{2}}\begin{bmatrix}0\\1\\0\\1\end{bmatrix}$ | $\frac{1}{\sqrt{2}}\begin{bmatrix}0\\1\\0\\-1\end{bmatrix}$ | $\frac{1}{\sqrt{2}}\begin{bmatrix}0\\1\\0\\j\end{bmatrix}$ | $\frac{1}{\sqrt{2}}\begin{bmatrix}0\\1\\0\\-j\end{bmatrix}$ |
|---|---|---|---|---|---|---|---|---|
| 8 to 15 | $\frac{1}{\sqrt{2}}\begin{bmatrix}0\\1\\1\\0\end{bmatrix}$ | $\frac{1}{\sqrt{2}}\begin{bmatrix}0\\1\\-1\\0\end{bmatrix}$ | $\frac{1}{\sqrt{2}}\begin{bmatrix}0\\1\\j\\0\end{bmatrix}$ | $\frac{1}{\sqrt{2}}\begin{bmatrix}0\\1\\-j\\0\end{bmatrix}$ | $\frac{1}{\sqrt{2}}\begin{bmatrix}1\\0\\0\\1\end{bmatrix}$ | $\frac{1}{\sqrt{2}}\begin{bmatrix}1\\0\\0\\-1\end{bmatrix}$ | $\frac{1}{\sqrt{2}}\begin{bmatrix}1\\0\\0\\j\end{bmatrix}$ | $\frac{1}{\sqrt{2}}\begin{bmatrix}1\\0\\0\\-j\end{bmatrix}$ |

It may be understood that a form of the second target codebook shown in Table 8 is a newly obtained reduced codebook. In this case, the second target codebook may not be in the form shown in Table 8. For example, the second target codebook may still be in the form shown in Table 3, and only the precoding matrices indicated by the indexes 0 to 15, 24 to 31, and 32 to 35 have a mark of being restricted to be selected by the communications apparatus, or precoding matrices indicated by the indexes 16 to 23, and 36 to 43 have a mark of being unrestricted to be selected by the communications apparatus.

A process of determining the second target codebook by using the method is relatively simple.

d. The network device determines, based on the uplink channel information and the physical antenna that is supported by the communications apparatus and that is simultaneously used for uplink transmission, a plurality of second precoding matrices that are in the first codebook and that are unrestricted to be selected by the terminal. It may be understood that the antenna capability indicated in the antenna capability reporting information corresponding to the method further includes at least the quantity of physical antennas that are supported by the communications apparatus and that are simultaneously used for uplink transmission and the physical antenna that is supported by the communications apparatus and that is simultaneously used for uplink transmission.

For example, if the first codebook is a codebook shown in Table 3, the network device learns, based on the antenna capability reporting information, that the communications apparatus may simultaneously send uplink information by using a physical antenna 0 and a physical antenna 2, simultaneously send uplink information by using a physical antenna 1 and a physical antenna 3, simultaneously send uplink information by using the physical antenna 0 and the physical antenna 3, and simultaneously send uplink information by using the physical antenna 1 and the physical antenna 2. In this case, $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \frac{1}{\sqrt{2}}\begin{bmatrix}1\\0\\-j\\0\end{bmatrix}, \frac{1}{\sqrt{2}}\begin{bmatrix}0\\1\\0\\1\end{bmatrix},$$

$$\frac{1}{\sqrt{2}}\begin{bmatrix}0\\1\\0\\-1\end{bmatrix}, \frac{1}{\sqrt{2}}\begin{bmatrix}0\\1\\0\\j\end{bmatrix}, \frac{1}{\sqrt{2}}\begin{bmatrix}0\\1\\0\\-j\end{bmatrix}, \frac{1}{\sqrt{2}}\begin{bmatrix}1\\0\\0\\1\end{bmatrix}, \frac{1}{\sqrt{2}}\begin{bmatrix}1\\0\\0\\-1\end{bmatrix},$$

-continued $$\frac{1}{\sqrt{2}}\begin{bmatrix}1\\0\\0\\j\end{bmatrix}, \frac{1}{\sqrt{2}}\begin{bmatrix}1\\0\\0\\-j\end{bmatrix}, \frac{1}{\sqrt{2}}\begin{bmatrix}0\\1\\1\\0\end{bmatrix}, \frac{1}{\sqrt{2}}\begin{bmatrix}0\\1\\-1\\0\end{bmatrix}, \frac{1}{\sqrt{2}}\begin{bmatrix}0\\1\\j\\0\end{bmatrix}, \text{and}$$

$$\frac{1}{\sqrt{2}}\begin{bmatrix}0\\1\\-j\\0\end{bmatrix}$$

are obtained based on the physical antennas that can be used by the communications apparatus to send uplink information. However, the network device may learn, based on previous experience, that system performance of an equivalent channel obtained based on $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \text{and } \frac{1}{\sqrt{2}}\begin{bmatrix}1\\0\\-j\\0\end{bmatrix}$$

(a method for obtaining an equivalent channel is multiplying an uplink channel matrix by a precoding matrix) is poor. For example, if a system capacity is lower than a first preset threshold and/or an SINR is lower than a second preset threshold, $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \frac{1}{\sqrt{2}}\begin{bmatrix}1\\0\\-j\\0\end{bmatrix}$$

are removed.

-continued $$\frac{1}{\sqrt{2}}\begin{bmatrix}0\\1\\j\\0\end{bmatrix}, \text{ and } \frac{1}{\sqrt{2}}\begin{bmatrix}0\\1\\-j\\0\end{bmatrix}$$

are the plurality of second precoding matrices. In this case, the second target codebook may be that shown in Table 9.

TABLE 9

| 0 to 7 | $\frac{1}{\sqrt{2}}\begin{bmatrix}0\\1\\0\\1\end{bmatrix}$ $\frac{1}{\sqrt{2}}\begin{bmatrix}0\\1\\0\\-1\end{bmatrix}$ $\frac{1}{\sqrt{2}}\begin{bmatrix}0\\1\\0\\j\end{bmatrix}$ $\frac{1}{\sqrt{2}}\begin{bmatrix}0\\1\\0\\-j\end{bmatrix}$ $\frac{1}{\sqrt{2}}\begin{bmatrix}0\\1\\1\\0\end{bmatrix}$ $\frac{1}{\sqrt{2}}\begin{bmatrix}0\\1\\-1\\0\end{bmatrix}$ $\frac{1}{\sqrt{2}}\begin{bmatrix}0\\1\\j\\0\end{bmatrix}$ $\frac{1}{\sqrt{2}}\begin{bmatrix}0\\1\\-j\\0\end{bmatrix}$ |
|---|---|
| 8 to 11 | $\frac{1}{\sqrt{2}}\begin{bmatrix}1\\0\\0\\1\end{bmatrix}$ $\frac{1}{\sqrt{2}}\begin{bmatrix}1\\0\\0\\-1\end{bmatrix}$ $\frac{1}{\sqrt{2}}\begin{bmatrix}1\\0\\0\\j\end{bmatrix}$ $\frac{1}{\sqrt{2}}\begin{bmatrix}1\\0\\0\\-j\end{bmatrix}$ |

It may be understood that a form of the second target codebook shown in Table 9 is a newly obtained reduced codebook. In this case, the second target codebook may not be in the form shown in Table 9. For example, the second target codebook may still be in the form shown in Table 3, and only the precoding matrices indicated by the indexes 0 to 15, 16 to 19, 24 to 31, and 32 to 35 have a mark of being restricted to be selected by the communications apparatus, or precoding matrices indicated by the indexes 20 to 23, and 36 to 43 have a mark of being unrestricted to be selected by the communications apparatus.

In a process of determining the second target codebook by using the method, a target physical antenna that enables relatively desirable system performance can be selected to send uplink information.

e. The network device determines, based on the uplink channel information, a plurality of second precoding matrices that are in the first codebook and that are unrestricted to be selected by the terminal.

If the first codebook is a codebook shown in Table 4, the network device may learn, based on previous experience, that system performance of an equivalent channel obtained based on precoding matrices indicated by the indexes 3 to 5 and the indexes 9 to 17 is poor. For example, a system capacity is less than a first preset threshold and/or an SINR is less than a second preset threshold. In this case, precoding matrices indicated by the indexes 3 to 5 and 9 to 17 shown in Table 4 are used as a plurality of third precoding matrices restricted to be selected by the communications apparatus, and precoding matrices indicated by the indexes 0 to 2 and 6 to 8 are used as a plurality of second precoding matrices unrestricted to be selected by the communications apparatus. As shown in Table 10, the second target codebook is obtained based on the precoding matrices corresponding to the indexes 0 to 2 and 6 to 8 in Table 4.

TABLE 10

| 0 to 2 | $\frac{1}{\sqrt{2}}\begin{bmatrix}1&0\\0&0\\0&1\\0&0\end{bmatrix}$ $\frac{1}{2}\begin{bmatrix}1&1\\0&0\\1&-1\\0&0\end{bmatrix}$ $\frac{1}{2}\begin{bmatrix}1&1\\0&0\\j&-j\\0&0\end{bmatrix}$ |
|---|---|

TABLE 10-continued

| 3 to 5 | $\frac{1}{\sqrt{2}}\begin{bmatrix}1&0\\0&1\\0&0\\0&0\end{bmatrix}$ $\frac{1}{2}\begin{bmatrix}1&1\\1&-1\\0&0\\0&0\end{bmatrix}$ $\frac{1}{2}\begin{bmatrix}1&1\\j&-j\\0&0\\0&0\end{bmatrix}$ |
|---|---|

It may be understood that a form of the second target codebook shown in Table 10 is a newly obtained reduced codebook. In this case, the second target codebook may not be in the form shown in Table 10. For example, the second target codebook may still be in the form shown in Table 4, and only the precoding matrices indicated by the indexes 3 to 5, and 9 to 17 have a mark of being restricted to be selected by the communications apparatus, or precoding matrices indicated by the indexes 0 to 2, and 6 to 8 have a mark of being unrestricted to be selected by the communications apparatus.

In conclusion, it can be learned that if the second target codebook is a reduced codebook and has a small quantity of indexes, fewer bits are occupied when the index of the second target precoding matrix is subsequently indicated to the communications apparatus, thereby reducing network overheads. For example, the second target codebook shown in Table 6 is a reduced codebook, and has only the indexes 0 to 3. In this case, only two bits need to be occupied when the index of the second target precoding matrix is subsequently indicated to the communications apparatus. However, six bits need to be occupied when the index of the second target precoding matrix is subsequently indicated to the communications apparatus by using the original codebook shown in Table 3. Therefore, network overheads of indicating the index of the second target precoding matrix in the second target codebook to the communications apparatus can be reduced.

In a process of determining the second target codebook by using the method, a target physical antenna that enables relatively desirable system performance can be selected to send uplink information.

The following describes the method for determining the second target precoding matrix in the second target codebook.

The network device obtains the second target precoding matrix from the second target codebook based on the antenna capability of the communications apparatus or the uplink channel information.

Herein, that the network device obtains the second target precoding matrix from the second target codebook based on the antenna capability of the communications apparatus or the uplink channel information may be understood as follows: (1) The network device obtains the second target precoding matrix from the second target codebook based only on the antenna capability of the communications apparatus. (2) The network device obtains the second target precoding matrix from the second target codebook based only on the uplink channel information. (3) The network device obtains the second target precoding matrix from the second target codebook based on the antenna capability of the communications apparatus and the uplink channel information.

Specifically, if the method for obtaining the second target codebook is the first possible implementation of obtaining the second target codebook, that is, the second target codebook is the original first codebook stored in the network device, the method for obtaining the second target precoding matrix may use the following five implementable implementations:

In a first implementable implementation, determining, by the network device, based on the learned quantity of physical antennas that are supported by the communications apparatus and that are simultaneously used for uplink transmission, the second target precoding matrix in the plurality of first precoding matrices included in the second target codebook is specifically: selecting, by the network device, any one of a plurality of precoding matrices that can indicate the quantity of physical antennas as the second target precoding matrix based on the quantity of physical antennas that are supported by the communications apparatus and that are simultaneously used for uplink transmission.

For example, if the second target codebook is a codebook shown in Table 2, the network device learns, based on the antenna capability reporting information, that the quantity of physical antennas that are supported by the communications apparatus and that are simultaneously used for uplink transmission is 1, and precoding matrices $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{and } \begin{bmatrix}0\\0\\0\\1\end{bmatrix}$$

in the codebook shown in Table 2 each include one row of non-zero element which indicates one physical antenna, one of $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{and } \begin{bmatrix}0\\0\\0\\1\end{bmatrix}$$

is selected as the second target precoding matrix. For example, if a first precoding matrix $$\begin{bmatrix}1\\0\\0\\0\end{bmatrix}$$

is selected, the first precoding matrix $$\begin{bmatrix}1\\0\\0\\0\end{bmatrix}$$

is the second target precoding matrix.

In the first implementable implementation, a process of determining the second target precoding matrix is simple.

In a second implementable implementation, determining, by the network device, based on the learned uplink channel information and the learned quantity of physical antennas that are supported by the communications apparatus and that are simultaneously used for uplink transmission, the second target precoding matrix in the plurality of first precoding matrices included in the second target codebook is specifically: determining, by the network device based on the quantity of physical antennas that are supported by the communications apparatus and that are simultaneously used for uplink transmission, a plurality of fourth precoding matrices that can indicate the quantity of physical antennas, in the second target codebook, and determining the second target precoding matrix in the plurality of fourth precoding matrices based on the uplink channel information.

For example, if the second target codebook is a codebook shown in Table 2, the network device learns, based on the antenna capability reporting information, that the quantity of physical antennas that can be used by the communications apparatus to simultaneously send uplink information is 1, and precoding matrices $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{and } \begin{bmatrix}0\\0\\0\\1\end{bmatrix}$$

in the codebook shown in Table 2 each include one row of non-zero element which indicates one physical antenna, $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{and } \begin{bmatrix}0\\0\\0\\1\end{bmatrix}$$

are a plurality of fourth precoding matrices. Then, based on the uplink channel information, an uplink channel matrix is multiplied by $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{and } \begin{bmatrix}0\\0\\0\\1\end{bmatrix},$$

to obtain four equivalent channels. To which equivalent channel matrix best system performance corresponds, a precoding matrix corresponding to the equivalent channel matrix is the second target precoding matrix. The system performance includes a system capacity, a signal to interference plus noise ratio (SINR), and the like. If system performance corresponding to an equivalent channel matrix obtained by multiplying a precoding matrix $$\begin{bmatrix} 0 \\ 0 \\ 0 \\ 1 \end{bmatrix}$$

by the uplink channel matrix is the best, the precoding matrix $$\begin{bmatrix} 0 \\ 0 \\ 0 \\ 1 \end{bmatrix}$$

is the second target precoding matrix.

In a second implementable implementation, because subchannels corresponding to all physical antennas may be different, and channel quality of all subchannels is different, in the second implementation, the second target precoding matrix is determined based on the uplink channel information, that is, each preselected precoding matrix is multiplied by the uplink channel matrix, to obtain an equivalent channel matrix. To which equivalent channel matrix best system performance corresponds, a precoding matrix corresponding to the equivalent channel matrix is the second target precoding matrix. As is described in the foregoing description that "to which physical antenna each row corresponds, an impulse response of a corresponding column in an uplink channel matrix is obtained based on an SRS transmitted by using the physical antenna", it can be learned that an equivalent channel matrix obtained by multiplying the second target precoding matrix by the uplink channel matrix is a channel corresponding to a physical antenna indicated by the second target precoding matrix. In this case, using a target physical antenna indicated by the second target precoding matrix to send uplink information can enable best system performance. In other words, a target physical antenna that enables relatively desirable system performance can be selected to send uplink information.

In a third implementable implementation, determining, by the network device, based on the learned physical antenna that is supported by the communications apparatus and that is simultaneously used for uplink transmission, the second target precoding matrix in the plurality of first precoding matrices included in the second target codebook is specifically: selecting, by the network device based on the physical antennas that can be used to send uplink information, any one of the plurality of precoding matrices that indicate the physical antennas that can be used to send uplink information, as the second target precoding matrix.

For example, if the second target codebook is a codebook shown in Table 2, the network device learns, based on the antenna capability reporting information, that the physical antenna that is supported by the communications apparatus and that is simultaneously used for uplink transmission is a physical antenna 0, a physical antenna 1, a physical antenna 2, or a physical antenna 3. That is, one of the physical antenna 0, the physical antenna 1, the physical antenna 2, and the physical antenna 3 may be selected to send uplink information. In the codebook shown in Table 2, $$\begin{bmatrix} 1 \\ 0 \\ 0 \\ 0 \end{bmatrix}$$

may indicate the physical antenna 0, $$\begin{bmatrix} 0 \\ 1 \\ 0 \\ 0 \end{bmatrix}$$

may indicate the physical antenna 1, $$\begin{bmatrix} 0 \\ 0 \\ 1 \\ 0 \end{bmatrix}$$

may indicate the physical antenna 2, and $$\begin{bmatrix} 0 \\ 0 \\ 0 \\ 1 \end{bmatrix}$$

may indicate the physical antenna 3, and the network device may select any one of the first precoding matrices $$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \text{ and } \begin{bmatrix} 0 \\ 0 \\ 0 \\ 1 \end{bmatrix}$$

as the second target precoding matrix. For example, if the first precoding matrix $$\begin{bmatrix} 1 \\ 0 \\ 0 \\ 0 \end{bmatrix}$$

is selected, the first precoding matrix $$\begin{bmatrix} 1 \\ 0 \\ 0 \\ 0 \end{bmatrix}$$

is the second target precoding matrix.

In the third implementable implementation, a process of determining the second target precoding matrix is simple.

In a fourth implementable implementation, the network device determines, based on the uplink channel information and the quantity of physical antennas that are supported by the communications apparatus and that are simultaneously used for uplink transmission, the second target precoding matrix in the plurality of first precoding matrices included in the second target codebook.

For example, the second target codebook may be a codebook shown in Table 2, the network device learns, based on the antenna capability reporting information, that the physical antennas that can be used by the communications apparatus to send uplink information are a combination (0, 2) of a physical antenna 0 and a physical antenna 2, and a combination (1, 3) of a physical antenna 1 and a physical antenna 3. That is, the physical antenna 0 and the physical antenna 2 may be used to simultaneously send uplink information, or the physical antenna 1 and the physical antenna 3 may be used to simultaneously send uplink information. In the codebook shown in Table 2, $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \text{and } \frac{1}{\sqrt{2}}\begin{bmatrix}1\\0\\-j\\0\end{bmatrix}$$

may indicate the combination of the physical antenna 0 and the physical antenna 2;

$$\frac{1}{\sqrt{2}}\begin{bmatrix}0\\1\\0\\1\end{bmatrix}, \frac{1}{\sqrt{2}}\begin{bmatrix}0\\1\\0\\-1\end{bmatrix}, \frac{1}{\sqrt{2}}\begin{bmatrix}0\\1\\0\\j\end{bmatrix}, \text{and } \frac{1}{\sqrt{2}}\begin{bmatrix}0\\1\\0\\-j\end{bmatrix}$$

may indicate the combination of the physical antenna 1 and the physical antenna 3. Then, one of the first precoding matrices $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \frac{1}{\sqrt{2}}\begin{bmatrix}1\\0\\-j\\0\end{bmatrix},$$

$$\frac{1}{\sqrt{2}}\begin{bmatrix}0\\1\\0\\1\end{bmatrix}, \frac{1}{\sqrt{2}}\begin{bmatrix}0\\1\\0\\-1\end{bmatrix}, \frac{1}{\sqrt{2}}\begin{bmatrix}0\\1\\0\\j\end{bmatrix}, \text{and } \frac{1}{\sqrt{2}}\begin{bmatrix}0\\1\\0\\-j\end{bmatrix}$$

is selected as the second target precoding matrix based on the uplink channel information. A specific method is as follows: The network device separately multiplies the uplink channel matrix by the foregoing eight first precoding matrices, to obtain eight equivalent channel matrices. To which equivalent channel matrix best system performance corresponds, a first precoding matrix corresponding to the equivalent channel matrix is the second target precoding matrix. The system performance includes a system capacity, a signal to interference plus noise ratio (Signal to interference plus Noise Ratio, SINR for short), and the like. If system performance corresponding to an equivalent channel matrix obtained by multiplying a first precoding matrix $$\frac{1}{\sqrt{2}}\begin{bmatrix}1\\0\\1\\0\end{bmatrix}$$

by the uplink channel matrix is the best, the first precoding matrix $$\frac{1}{\sqrt{2}}\begin{bmatrix}1\\0\\1\\0\end{bmatrix}$$

is the second target precoding matrix.

Further, to reduce a calculation amount and accelerate obtaining of the second target precoding matrix, based on previous experience which is that, for example, system performance of an equivalent channel obtained based on precoding matrices $$\frac{1}{\sqrt{2}}\begin{bmatrix}0\\1\\0\\-1\end{bmatrix} \text{and } \frac{1}{\sqrt{2}}\begin{bmatrix}0\\1\\0\\-j\end{bmatrix}$$

in the foregoing eight first precoding matrices is a relatively poor, for example, a system capacity is less than a first preset threshold and/or an SINR is less than a second preset threshold, the network device may only need to multiply the uplink channel matrix by the remaining six precoding matrices $$\frac{1}{\sqrt{2}}\begin{bmatrix}1\\0\\1\\0\end{bmatrix}, \frac{1}{\sqrt{2}}\begin{bmatrix}1\\0\\-1\\0\end{bmatrix}, \frac{1}{\sqrt{2}}\begin{bmatrix}1\\0\\j\\0\end{bmatrix}, \frac{1}{\sqrt{2}}\begin{bmatrix}1\\0\\-j\\0\end{bmatrix}, \frac{1}{\sqrt{2}}\begin{bmatrix}0\\1\\0\\1\end{bmatrix},$$

$$\text{and } \frac{1}{\sqrt{2}}\begin{bmatrix}0\\1\\0\\j\end{bmatrix},$$

to obtain the second target precoding matrix.

In the fourth implementation, a target physical antenna that enables relatively desirable system performance can be selected to send uplink information, and further, the selected target physical antenna is relatively accurate.

In a fifth possible implementation, the network device determines, based on the uplink channel information, the second target precoding matrix in the plurality of first precoding matrices included in the second target codebook.

Specifically, if the second target codebook may be a codebook shown in Table 3, a specific implementation of determining the second target precoding matrix in the second target codebook based on the uplink channel information may be as follows:

The network device separately multiplies the uplink channel matrix by the 18 first precoding matrices in Table 3, to obtain 18 equivalent channel matrices. To which equivalent channel matrix best system performance corresponds, a first precoding matrix corresponding to the equivalent channel matrix is the second target precoding matrix. The system performance includes a system capacity, an SINR, and the like. If system performance corresponding to an equivalent channel matrix obtained by multiplying a first precoding matrix $$\frac{1}{\sqrt{2}}\begin{bmatrix} 0 & 0 \\ 1 & 0 \\ 0 & 1 \\ 0 & 0 \end{bmatrix}$$

by the uplink channel matrix is the best, the first precoding matrix $$\frac{1}{\sqrt{2}}\begin{bmatrix} 0 & 0 \\ 1 & 0 \\ 0 & 1 \\ 0 & 0 \end{bmatrix}$$

is the second target precoding matrix.

Certainly, to reduce a calculation amount and accelerate obtaining of the second target precoding matrix, based on previous experience which is that, for example, system performance of an equivalent channel obtained by using specific precoding matrices is relatively poor, for example, a system capacity is less than a first preset threshold and/or an SINR is less than a first threshold, the network device may group such precoding matrices to a group A, and group remaining precoding matrices in the second target codebook to a group B. The group A is a group restricted to be selected by the terminal, and the group B is a group unrestricted to be selected by the terminal. In this case, the uplink channel matrix only needs to be multiplied by each precoding matrix in the group B, to obtain the second target precoding matrix.

In the fifth possible implementation, a target physical antenna that enables relatively desirable system performance can be selected to send uplink information.

If the method for obtaining the second target codebook is the second possible implementation of obtaining the second target codebook, that is, the second target codebook is a reduced codebook or a codebook with a mark of being restricted or being unrestricted to be selected by the communications apparatus, the method for obtaining the second target precoding matrix may use the following four implementable implementations:

In a first implementable implementation, any one of the plurality of precoding matrices included in the second target codebook is selected as the second target precoding matrix.

In a second implementable implementation, if the method for obtaining the second target codebook is the foregoing method e, determining, by the network device, based on the learned quantity of physical antennas that are supported by the communications apparatus and that are simultaneously used for uplink transmission, the second target precoding matrix in the plurality of first precoding matrices included in the second target codebook is specifically: selecting, by the network device based on the quantity of physical antennas that are supported by the communications apparatus and that are simultaneously used for uplink transmission, any one of the precoding matrices that can indicate the quantity of physical antennas, in the second target codebook, as the second target precoding matrix; or determining, by the network device, based on the learned uplink channel information and the learned quantity of physical antennas that are supported by the communications apparatus and that are simultaneously used for uplink transmission, the second target precoding matrix in the plurality of precoding matrices included in the second target codebook is specifically: determining, by the network device based on the learned quantity of physical antennas that are supported by the communications apparatus and that are simultaneously used for uplink transmission, a plurality of fourth precoding matrices in the plurality of precoding matrices included in the second target codebook, and determining a fourth precoding matrix as the second target precoding matrix, where the fourth precoding matrix is multiplied by the uplink channel matrix to obtain an equivalent channel with best system performance.

In a third implementable implementation, if the method for obtaining the second target codebook is any one of the foregoing methods a, b and e, determining, by the network device based on the learned physical antenna that is supported by the communications apparatus and that is simultaneously used for uplink transmission, the second target precoding matrix in the plurality of precoding matrices included in the second target codebook is specifically: selecting, by the network device, any one of the precoding matrices that can indicate the physical antenna that is supported by the communications apparatus and that is simultaneously used for uplink transmission from the second target codebook as the second target precoding matrix; or determining, by the network device, a plurality of fourth precoding matrices in the plurality of precoding matrices included in the second target codebook based on the learned physical antenna that is supported by the communications apparatus and that is simultaneously used for uplink transmission, and determining a fourth precoding matrix as the second target precoding matrix, where the fourth precoding matrix is multiplied by the uplink channel matrix to obtain an equivalent channel with best system performance.

In a fourth implementable implementation, if the method for obtaining the second target codebook is any one of the foregoing methods a to e, determining, by the network device based on the uplink channel information, the second target precoding matrix in the plurality of first precoding matrices included in the second target codebook is specifically: separately multiplying the uplink channel matrix by the plurality of precoding matrices in the second target codebook, to obtain a plurality of equivalent channel matrices, and determining a precoding matrix corresponding to an equivalent channel matrix with best system performance as the second target precoding matrix.

For step S205, after determining the quantity of layers for uplink transmission and the second target precoding matrix, the network device sends the quantity of layers for uplink transmission and the index of the second target precoding matrix in the second target codebook to the communications apparatus.

The quantity of layers for uplink transmission and the index may be sent to the communications apparatus by using downlink control information (DCI). To be specific, the network device sends DCI to the communications apparatus, and the DCI includes the quantity of layers for uplink transmission and the index of the second target precoding matrix in the second target codebook. Indication information of the quantity of layers for uplink transmission may occupy a first field in the DCI information, and indication information of the index may occupy a second field in the DCI information. In this case, the index of the second target precoding matrix in the second target codebook and the quantity of layers for uplink transmission are independently encoded.

In addition, alternatively, the index of the second target precoding matrix in the second target codebook and the quantity of layers for uplink transmission may be jointly encoded and indicated by using same indication information, and may occupy one field in the DCI information. In other words, one combination index is defined for each combination of the quantity of layers for uplink transmission and the index of the precoding matrix, and the indication information indicates a combination index corresponding to a combination of the quantity of layers for uplink transmission and the index of the second target precoding matrix that are determined by the network device.

For step S206, if the quantity of layers for uplink transmission and the index of the second target precoding matrix in the second target codebook are sent to the communications apparatus by using the DCI, the communications apparatus receives the DCI, and obtains the quantity of layers for uplink transmission and the index of the precoding matrix after parsing the DCI.

The communications apparatus determines the first target codebook based on the quantity of layers for uplink transmission and the quantity of physical antennas included in the communications apparatus. A person skilled in the art may understand that the first target codebook is the same as the second target codebook, the first target codebook is a codebook stored in the communications apparatus, and the second target codebook is a codebook stored in the network device.

A precoding matrix that corresponds to the index and that is in a plurality of precoding matrices in the first target codebook is determined as the first target precoding matrix, where the first target precoding matrix is the same as the second target precoding matrix.

It may be understood that, if the second target codebook is the original codebook that is stored on the network device side and that corresponds to the quantity of layers for uplink transmission and the quantity of physical antennas included in the communications apparatus, the first target codebook is also the original codebook that is stored on the communications apparatus side and that corresponds to the quantity of layers for uplink transmission and the quantity of physical antennas included in the communications apparatus.

For example, if the quantity of layers for uplink transmission is 1, and the quantity of physical antennas of the communications apparatus is 4, the first target codebook is a codebook shown in Table 2, and is the same as the second target codebook that is determined by the network device when the determined quantity of layers for uplink transmission is 1 and the communications apparatus reports that the communications apparatus has four physical antennas.

After it is determined that the first target codebook is the codebook shown in Table 2, if the index obtained by the communications apparatus is 0, the first target precoding matrix is $$\begin{bmatrix} 1 \\ 0 \\ 0 \\ 0 \end{bmatrix}.$$

It may be understood that, if the second target codebook is obtained by using the second implementable implementation of obtaining the second target codebook, that is, the second target codebook is not the original first codebook stored in the network device, the first target codebook is not the original first codebook stored in the communications apparatus. The following describes a method for obtaining the first target codebook in this case.

The communications apparatus may first obtain the first target codebook before receiving the index of the second target precoding matrix in the second target codebook and the quantity of layers for uplink transmission that are sent by the network device to the communications apparatus, or the communications apparatus may obtain the first target codebook before receiving the index of the second target precoding matrix in the second target codebook and the quantity of layers for uplink transmission that are sent by the network device.

A method for determining the first target codebook corresponding to "the communications apparatus may obtain the first target codebook before receiving the index of the second target precoding matrix in the second target codebook and the quantity of layers for uplink transmission that are sent by the network device to the communications apparatus" may be implemented in the following two implementable manners, but is not limited to the two implementable manners.

In a first implementable manner, the communications apparatus obtains at least one target codebook based on the antenna capability of the communications apparatus and at least one first codebook, and determines the first target codebook in the at least one target codebook based on the quantity of layers for uplink transmission and the quantity of physical antennas of the terminal device.

In this case, the first codebook is a codebook that is stored on the communications apparatus side and that corresponds to the antenna capability of the communications apparatus. For example, if the communications apparatus supports 1T4R, there is only one first codebook, and the first codebook may be a codebook shown in Table 2; if the communications apparatus supports 2T4R, there are two first codebooks, and the first codebooks may be codebooks shown in Table 2 and Table 4.

As described above, the antenna capability includes: the quantity of physical antennas that are supported by the communications apparatus and that are simultaneously used for uplink transmission and/or the physical antenna that is supported by the communications apparatus and that is simultaneously used for uplink transmission.

If the network device side obtains the second target codebook based on the first codebook and the quantity of physical antennas that are supported by the communications apparatus and that are simultaneously used for uplink transmission (namely, the method corresponding to a), for each first codebook, the communications apparatus obtains the target codebook corresponding to the first codebook also based on the first codebook and the quantity of physical antennas that are supported by the communications apparatus and that are simultaneously used for uplink transmission. A manner of obtaining each target codebook is the same as the manner of obtaining the second target codebook.

If the network device side obtains the second target codebook based on the first codebook and the physical antenna that is supported by the communications apparatus and that is simultaneously used for uplink transmission (namely, the method corresponding to c), for each first codebook, the communications apparatus obtains the target codebook corresponding to the first codebook also based on the first codebook and the physical antenna that is supported by the communications apparatus and that is simultaneously used for uplink transmission. A manner of obtaining each target codebook is the same as the manner of obtaining the second target codebook.

The first target codebook is determined in the at least one target codebook based on the quantity of layers for uplink transmission. In other words, if there are a plurality of target codebooks, a target codebook in which a quantity of columns of a precoding matrix is the same as the quantity of layers for uplink transmission is the first target codebook.

In this implementable manner, the communications apparatus can obtain the first target codebook without a need of interacting with the network device, and network overheads are low.

In a second implementable manner, the network device sends first indication information to the communications apparatus, and after receiving the first indication information, the communications apparatus obtains the at least one target codebook based on the first indication information and each codebook stored in the communications apparatus; and determines the first target codebook in the at least one target codebook based on the quantity of layers for uplink transmission and the quantity of physical antennas of the terminal device.

The first indication information is used to indicate a precoding matrix that is in the first codebook and that is used to obtain the first target codebook; the first indication information is used to indicate a precoding matrix that is in the first codebook and that is not used to obtain the first target codebook; the first indication information is used to indicate a precoding matrix group that is in the first codebook and that is used to obtain the first target codebook, where the precoding matrix group includes precoding matrices that are in the first codebook and that are used to obtain the first target codebook; or the first indication information is used to indicate a precoding matrix group that is in the first codebook and that is not used to obtain the first target codebook, where the precoding matrix group includes precoding matrices that are in the first codebook and that are not used to obtain the first target codebook.

A meaning of "or" between purposes of the first indication information makes the first indication information have the following forms:

(1) the first indication information is used to indicate a precoding matrix that is in the first codebook and that is used to obtain the first target codebook;

(2) the first indication information is used to indicate a precoding matrix that is in the first codebook and that is not used to obtain the first target codebook;

(3) the first indication information is used to indicate a precoding matrix that is in the first codebook and that is used to obtain the first target codebook, and a precoding matrix that is in the first codebook and that is not used to obtain the first target codebook;

(4) the first indication information is used to indicate a precoding matrix group that is in the first codebook and that is used to obtain the first target codebook, where the precoding matrix group includes precoding matrices that are in the first codebook and that are used to obtain the first target codebook;

(5) the first indication information is used to indicate a precoding matrix group that is in the first codebook and that is not used to obtain the first target codebook, where the precoding matrix group includes precoding matrices that are in the first codebook and that are not used to obtain the first target codebook; and (6) the first indication information is used to indicate a precoding matrix group that is in the first codebook and that is used to obtain the first target codebook, where a precoding matrix group that is in the first codebook and that is not used to obtain the first target codebook.

A person skilled in the art may understand that the network device may further send, to the communications apparatus, information indicating specific precoding matrices included in a first precoding matrix group and/or information indicating specific precoding matrices included in a second precoding matrix group.

A method for determining the first target codebook corresponding to "the communications apparatus may obtain the first target codebook after receiving the index of the second target precoding matrix in the second target codebook and the quantity of layers for uplink transmission that are sent by the network device to the communications apparatus" may be implemented in the following four implementable manners, but is not limited to the four implementable manners.

The method for obtaining the first target codebook may be implemented in the following four implementable manners, but is not limited to the four implementable manners.

In a first implementable manner, after receiving the quantity of layers for uplink transmission, the communications apparatus obtains the first codebook corresponding to the quantity of layers for uplink transmission and the quantity of physical antennas of the communications apparatus, and obtains the first target codebook based on the antenna capability of the communications apparatus and the first codebook, where the first target codebook is a subset of the first codebook.

As described above, the antenna capability includes: the quantity of physical antennas that are supported by the communications apparatus and that are simultaneously used for uplink transmission and/or the physical antenna that is supported by the communications apparatus and that is simultaneously used for uplink transmission.

In this case, if the network device side obtains the second target codebook based on the first codebook and the quantity of physical antennas that are supported by the communications apparatus and that are simultaneously used for uplink transmission (namely, the method corresponding to a), the communications apparatus obtains the first target codebook also based on the first codebook and the quantity of physical antennas that are supported by the communications apparatus and that are simultaneously used for uplink transmission. A manner of obtaining the first target codebook is the same as the manner of obtaining the second target codebook.

If the network device side obtains the second target codebook based on the first codebook and the physical antenna that is supported by the communications apparatus and that is simultaneously used for uplink transmission (namely, the method corresponding to c), the communications apparatus obtains the first target codebook also based on the first codebook and the physical antenna that is supported by the communications apparatus and that is simultaneously used for uplink transmission. A manner of obtaining the first target codebook is the same as the manner of obtaining the second target codebook.

In this implementable manner, the communications apparatus can obtain the first target codebook without a need of interacting with the network device, and network overheads are low.

In a second implementable manner, after receiving the quantity of layers for uplink transmission, the communications apparatus obtains the first codebook corresponding to the quantity of layers for uplink transmission and the quantity of physical antennas of the communications apparatus, and obtains the first target codebook based on the first codebook and the first indication information, where the first target codebook is a subset of the first codebook.

Specifically, after the network device determines a plurality of second precoding matrices that are in the first codebook and that are unrestricted to be selected by the communications apparatus (where the first codebook is the original codebook that is stored in the network device and that corresponds to the quantity of layers for uplink transmission and the quantity of physical antennas of the communications apparatus, and for details about a method for obtaining the plurality of second precoding matrices, refer to the foregoing obtaining method), the network device sends first indication information to the communications apparatus. The first indication information is the same as the foregoing first indication information. Details are not described herein again.

The first indication information may be delivered to the communications apparatus by using radio resource control (RRC) signaling. The first indication information may be delivered to the communications apparatus after the network device determines the first codebook and before the network device sends indexes of the second precoding matrices in the second target codebook and the quantity of layers for uplink transmission to the communications apparatus. For example, as described above, the first codebook is a codebook shown in Table 3. The network device learns, based on the antenna capability reporting information, a quantity of physical antennas that are supported by the communications apparatus and that are simultaneously used for uplink transmission, and determines that $$\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{ and } \begin{bmatrix}0\\0\\0\\1\end{bmatrix}$$

that respectively correspond to the indexes 24 to 27 are the plurality of second precoding matrices.

If the first indication information is used to indicate a precoding matrix that is in the first codebook and that is used to obtain the first target codebook, and/or a precoding matrix that is in the first codebook and that is not used to obtain the first target codebook, the RRC signaling may include bitmap information. In this case, the bitmap may have 40 bits, respectively indicating whether 40 precoding matrices in the first codebook shown in Table 3 are restricted to be selected. The bitmap information may be in a form of 0000000000000000000000001111000000000000. The first 24 0s sequentially indicate that precoding matrices corresponding to the indexes 0 to 23 in the first codebook shown in Table 3 are restricted to be selected by the communications apparatus, in other words, the precoding matrices corresponding to the indexes 0 to 23 are not used to obtain the first target codebook. "1s" at the $25^{th}$ bit to the $28^{th}$ bit sequentially indicate that precoding matrices corresponding to the indexes 24 to 27 in the first codebook shown in Table 3 are unrestricted to be selected by the communications apparatus, in other words, the precoding matrices corresponding to the indexes 24 to 27 are used to obtain the first target codebook. "0s" at the $26^{th}$ bit to the $40^{th}$ bit sequentially indicate that precoding matrices corresponding to the indexes 28 to 39 in the first codebook shown in Table 3 are restricted to be selected by the communications apparatus, in other words, the precoding matrices corresponding to the indexes 28 to 39 are not used to obtain the first target codebook.

In addition to the foregoing form, the bitmap information may include indication information of the indexes 24 to 27 in the first codebook, or indication information of the indexes 0 to 23 and the indexes 28 to 39 in the first codebook.

After receiving the quantity of layers for uplink transmission, the communications apparatus obtains the original codebook that is stored in the communications apparatus and that corresponds to the quantity of layers for uplink transmission and the quantity of physical antennas of the communications apparatus. The original codebook may also be referred to as the first codebook herein, because the original codebook that is stored in the communications apparatus and that corresponds to the quantity of physical antennas is consistent with the original codebook that is stored in the network device and that corresponds to the quantity of physical antennas.

The communications apparatus obtains the first target codebook based on the plurality of second precoding matrices that are used to obtain the first target codebook and that are indicated in the first indication information sent by the network device. For example, if the original codebook (the first codebook) that is stored in the communications apparatus and that corresponds to the quantity of layers for uplink transmission and the quantity of physical antennas of the communications apparatus is a codebook shown in Table 3, the plurality of second precoding matrices are determined by the network device based on the quantity of physical antennas that are supported by the communications apparatus and that are simultaneously used for uplink transmission. The quantity of physical antennas that are supported by the communications apparatus and that are simultaneously used for uplink transmission is 1. In this case, the first target codebook is in a form as that shown in Table 6.

If the first indication information is used to indicate a precoding matrix group that is in the first codebook and that is used to obtain the first target codebook, and/or a precoding matrix group that is in the first codebook and that is not used to obtain the first target codebook, the network device combines a plurality of second precoding matrix groups into a first precoding matrix group, and combines a plurality of third precoding matrices other than the plurality of second precoding matrices in the first codebook into a second precoding matrix group. In other words, the first precoding matrix group is a group used to obtain the first target codebook, and the second precoding matrix group is a group not used to obtain the first target codebook.

In this case, the first indication information may include two bits. One bit is used to indicate whether the first precoding matrix group is used to obtain the first target codebook, and the other bit is used to indicate whether the second precoding matrix group is used to obtain the first target codebook. For example, the second indication information may be in a form of "10". "1" indicates that each precoding matrix included in the first precoding matrix group is used to obtain the first target codebook, in other words, "1" indicates that the first precoding matrix group is used to obtain the first target codebook. "0" indicates that each precoding matrix included in the second precoding matrix group is not used to obtain the first target codebook, in other words, "0" indicates that the second precoding matrix group is not used to obtain the first target codebook.

In addition to the foregoing form, the first indication information may include only indication information of an index of the first precoding matrix group, or the first indication information includes only indication information of an index of the second precoding matrix group.

A person skilled in the art may understand that the network device may further send, to the communications apparatus, information indicating specific precoding matrices included in the first precoding matrix group and/or information indicating specific precoding matrices included in the second precoding matrix group.

The communications apparatus obtains the first target codebook based on a plurality of second precoding matrices included in the first precoding matrix group that is used to obtain the first target codebook and that is indicated in the first indication information sent by the network device. For example, if the original codebook (the first codebook) that is stored in the communications apparatus and that corresponds to the quantity of layers for uplink transmission and the quantity of physical antennas of the communications apparatus is a codebook shown in Table 3, the plurality of second precoding matrices are determined by the network device based on the physical antenna that is supported by the communications apparatus and that is simultaneously used for uplink transmission, and the communications apparatus may simultaneously send uplink information by using a physical antenna 0 and a physical antenna 2, simultaneously send uplink information by using the physical antenna 0 and a physical antenna 3, and simultaneously send uplink information by using a physical antenna 1 and the physical antenna 2, the first target codebook is in a form as that shown in Table 8 above.

In a third implementable manner, after the network device determines a plurality of second precoding matrices that are in the first codebook (where the first codebook is the original codebook that is stored in the network device and that corresponds to the quantity of layers for uplink transmission and the quantity of physical antennas of the communications apparatus) and that are unrestricted to be selected by the communications apparatus, the network device combines the plurality of second precoding matrices into a first precoding matrix group, and combines a plurality of third precoding matrices other than the plurality of second precoding matrices in the first codebook into a second precoding matrix group. In other words, the first precoding matrix group is a group used to obtain the first target codebook, and the second precoding matrix group is a group not used to obtain the first target codebook.

As described above, the network device may send the index of the second target precoding matrix in the second target codebook and the quantity of layers for uplink transmission to the communications apparatus by using DCI. In other words, the network device sends the DCI to the communications apparatus, where the DCI includes the index of the second target precoding matrix in the second target codebook and the quantity of layers for uplink transmission. In this case, the network device may establish a correspondence between each precoding matrix group included in the first codebook and parity of a number of a time domain occupied by the DCI. For example, the first precoding matrix group corresponds to an odd number of a time domain occupied by the DCI, and the second precoding matrix group corresponds to an even number of a time domain occupied by the DCI. Alternatively, the first precoding matrix group corresponds to an even number of a time domain occupied by the DCI, and the second precoding matrix group corresponds to an odd number of a time domain occupied by the DCI.

Then, the network device sends third indication information to the communications apparatus, where the third indication information is used to indicate a correspondence between each precoding matrix group included in the first codebook and parity of a number of a time domain occupied by the DCI. The network device may further send, to the communications apparatus, information indicating specific precoding matrices included in the first precoding matrix group and/or information indicating specific precoding matrices included in the second precoding matrix group.

If the first precoding matrix group corresponds to an odd number of a time domain occupied by the DCI, the network device sends the DCI to the communications apparatus in the time domain that is odd-numbered.

In this case, if the communications apparatus obtains the DCI in the time domain that is odd-numbered, the communications apparatus determines precoding matrices included in a corresponding first precoding matrix group, based on the correspondence that is indicated by the third indication information and that is between the first precoding matrix group in the first codebook and the odd number of the time domain occupied by the DCI.

If the first precoding matrix group corresponds to an even number of a time domain occupied by the DCI, the network device sends the DCI to the communications apparatus in the time domain that is even-numbered.

In this case, if the communications apparatus obtains the DCI in the time domain that is even-numbered, the communications apparatus determines precoding matrices included in a corresponding first precoding matrix group, based on the correspondence that is indicated by the third indication information and that is between the first precoding matrix group in the first codebook and the even number of the time domain occupied by the DCI.

In a fourth implementable manner, after the network device determines a plurality of second precoding matrices that are in the first codebook (where the first codebook is the original codebook that is stored in the network device and that corresponds to the quantity of layers for uplink transmission and the quantity of physical antennas of the communications apparatus) and that are unrestricted to be selected by the communications apparatus, the network device combines the plurality of second precoding matrices into a first precoding matrix group, and combines a plurality of third precoding matrices other than the plurality of second precoding matrices in the first codebook into a second precoding matrix group. In other words, the first precoding matrix group is a group used to obtain the first target codebook, and the second precoding matrix group is a group not used to obtain the first target codebook.

The network device sends DCI to the communications apparatus, where the DCI includes the index of the second target precoding matrix in the second target codebook and the quantity of layers for uplink transmission. In this case, the network device establishes a correspondence between each precoding matrix group included in the first codebook and each CRC mask group. For example, a first precoding matrix group corresponds to a first CRC mask group, and a second precoding matrix group corresponds to a second CRC mask group; or a first precoding matrix group corresponds to a second CRC mask group, and a second precoding matrix group corresponds to a first CRC mask group. A CRC mask group includes at least one CRC mask.

Then, fourth indication information is sent to the communications apparatus, where the fourth indication information is used to indicate the correspondence between each precoding matrix group included in the first codebook and each CRC mask group. The network device further sends, to the communications apparatus, information indicating specific precoding matrices included in the first precoding matrix group and/or information indicating specific precoding matrices included in the second precoding matrix group, and sends, to the communications apparatus, specific CRC masks included in the first CRC mask group and/or specific CRC masks included in the second CRC mask group.

If the first precoding matrix group corresponds to the first CRC mask group, a mask of DCI sent by the network device to the communications apparatus is a mask in the first CRC mask group.

In this case, if a CRC mask obtained after the communications apparatus parses the DCI is a mask in the first CRC mask group, the communications apparatus obtains the first target codebook based on the precoding matrices included in the first precoding matrix group that is indicated in the fourth indication information and that corresponds to the first CRC mask group.

If the first precoding matrix group corresponds to the second CRC mask group, a mask of DCI sent by the network device to the communications apparatus is a mask in the second CRC mask group.

In this case, if a CRC mask obtained after the communications apparatus parses the DCI is a mask in the second CRC mask group, the communications apparatus obtains the first target codebook based on the precoding matrices included in the first precoding matrix group that is indicated in the fourth indication information and that corresponds to the second CRC mask group.

For step S207, the communications apparatus determines, based on the first target precoding matrix that corresponds to the index and that is in the plurality of first precoding matrices, a target physical antenna used by the communications apparatus to send uplink information, where the first target precoding matrix is the same as the second target precoding matrix.

Specifically, after the communications apparatus receives the index, the precoding matrix corresponds to the index in the first target codebook determined in step S206 is the first target precoding matrix.

As described above, the second target codebook is the same as the first target codebook. Because an index corresponding to the first target precoding matrix is the same as an index corresponding to the second target precoding matrix, the first target precoding matrix is also the same as the second target precoding matrix.

As described above, if the first target precoding matrix is $$\begin{bmatrix} 1 \\ 0 \\ 0 \\ 0 \end{bmatrix},$$

and indicates a physical antenna 0, it is determined that a target physical antenna used by the communications apparatus to send uplink information is the physical antenna 0. If the first target precoding matrix is $$\frac{1}{\sqrt{2}} \begin{bmatrix} 1 \\ 0 \\ 1 \\ 0 \end{bmatrix},$$

and indicates a physical antenna 0 and a physical antenna 2, it is determined that target physical antennas used by the communications apparatus to send uplink information is the physical antenna 0 and the physical antenna 2 that simultaneously complete transmission of one data stream.

Further, if a PUSCH is configured as a four-antenna port, and the communications apparatus has four physical antennas, there may be a one-to-one mapping relationship between the antenna ports and the physical antennas. For example, an antenna port 0 is mapped to a physical antenna 0, an antenna port 1 is mapped to a physical antenna 1, an antenna port 2 is mapped to a physical antenna 2, and an antenna port 3 is mapped to a physical antenna 3. In this case, if the communications apparatus selects the physical antenna 0 to send uplink information, an antenna port corresponding to the uplink information is the antenna port 0.

If a PUSCH is configured as a two-antenna port, and the communications apparatus has four physical antennas, one antenna port may be mapped to two physical antennas. For example, an antenna port 0 is mapped to a physical antenna 0 and a physical antenna 1, and an antenna port 1 is mapped to a physical antenna 2 and a physical antenna 3. In this case, if the communications apparatus selects the physical antenna 0 and the physical antenna 2 to send uplink information, antenna ports corresponding to the uplink information are the antenna port 0 and the antenna port 1. If the communications apparatus selects the physical antenna 0 and the physical antenna 1 to send uplink information, an antenna port corresponding to the uplink information is the antenna port 0.

Information for uplink transmission in this embodiment may be data sent on a PUSCH. In this case, this embodiment is about antenna selection for the PUSCH.

In this embodiment, at least some precoding matrices in a codebook may indicate the physical antennas of the communications apparatus. The network device obtains the second target precoding matrix based on the antenna capability supported by the communications apparatus and/or the uplink channel information, and sends an index indicator of the second target precoding matrix to the communications apparatus. The communications apparatus may determine, based on the index, the first target precoding matrix corresponding to the index in the codebook stored on the terminal side. The first target precoding matrix is the same as the second target precoding matrix, and a physical antenna indicated by the first target precoding matrix is the determined target physical antenna that is used by the communications apparatus to send uplink information, so that uplink antenna selection of a plurality of communications apparatuses supporting different antenna capabilities is implemented. In addition, if the second target precoding matrix is determined by the network device based on the uplink channel information, it is ensured that when the communications apparatus sends uplink information by using the target physical antenna, system performance is the best, that is, the communications apparatus can select the target physical antenna that enables the best system performance to send uplink information.

Figure 3:
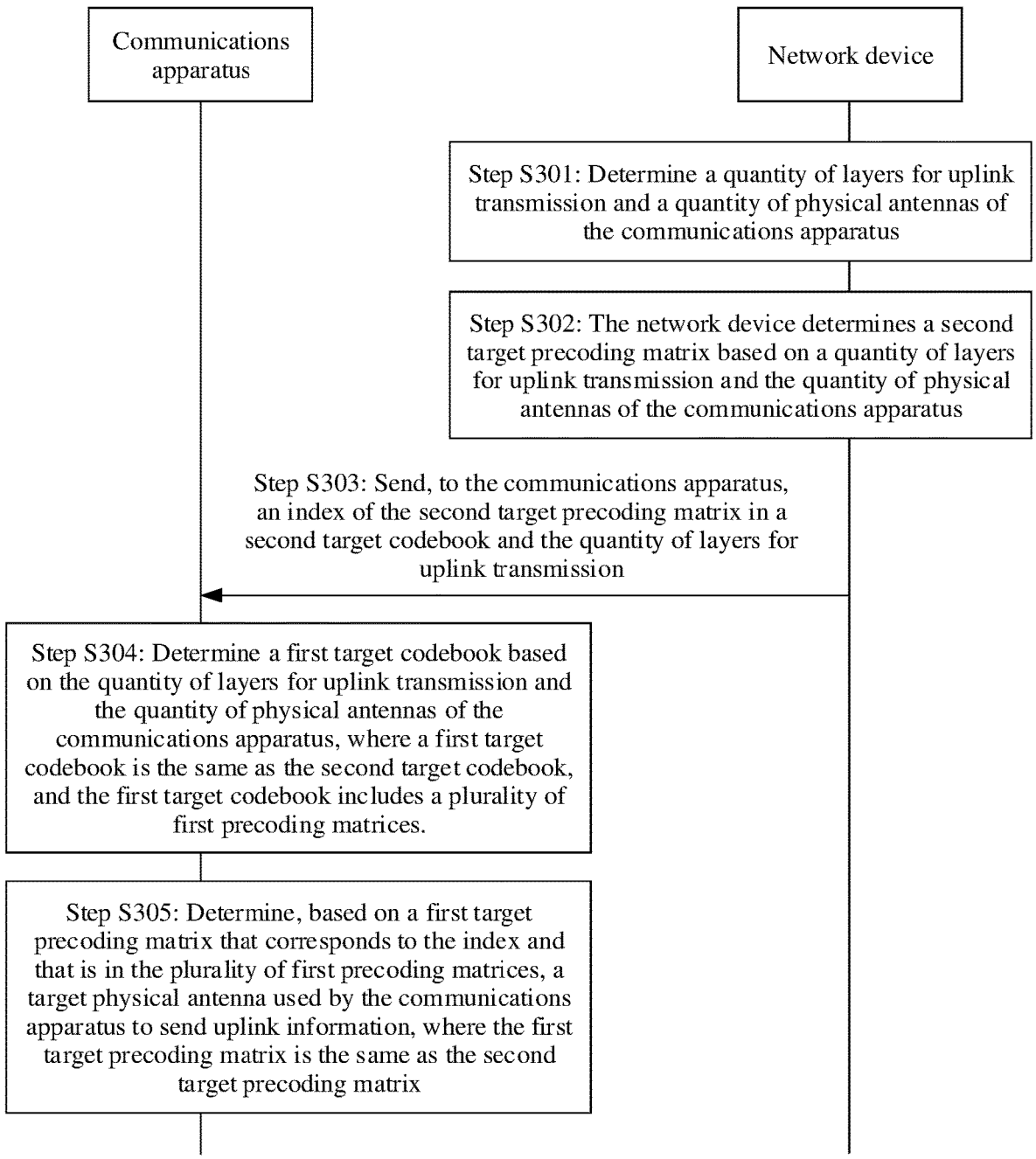
FIG. 3 is a signaling flowchart 2 of an uplink antenna selection method according to an embodiment of this application.

FIG. 3 is a signaling flowchart 2 of an uplink antenna selection method according to an embodiment of this application. Referring to FIG. 3, the method in this embodiment includes the following steps.

Step S301: A network device determines a quantity of layers for uplink transmission and a quantity of physical antennas of a communications apparatus.

Step S302: The network device determines a second target precoding matrix based on the quantity of layers for uplink transmission and the quantity of physical antennas of the communications apparatus.

Step 303: The network device sends, to the communications apparatus, an index of the second target precoding matrix in a second target codebook and the quantity of layers for uplink transmission.

Step S304: The communications apparatus determines a first target codebook based on the quantity of layers for uplink transmission and the quantity of physical antennas included in the communications apparatus, where the first target codebook is the same as the second target codebook, and the first target codebook includes a plurality of first precoding matrices.

Step S305: The communications apparatus determines, based on a first target precoding matrix that corresponds to the index and that is in the plurality of first precoding matrices, a target physical antenna used by the communications apparatus to send uplink information, where the first target precoding matrix is the same as the second target precoding matrix.

Specifically, step S301 and step S302 in this embodiment are a process in which the network device determines the quantity of layers for uplink transmission and the second target precoding matrix based on a plurality of pieces of information sent by the communications apparatus. For specific implementation, refer to content related to step S201 to step S204 in the previous embodiment.

Step S303 is a process in which the network device sends the index of the second target precoding matrix in the second target codebook and the quantity of layers for uplink transmission to the communications apparatus. For specific implementation, refer to step S205 in the previous embodiment.

Step S304 is a process in which the communications apparatus determines the first target precoding matrix. For specific implementation, refer to step S206 in the previous embodiment.

Step S305 is a process in which the communications apparatus determines the target physical antenna used to send uplink information. For specific implementation, refer to step S207 in the previous embodiment.

According to the uplink antenna selection method, uplink antenna selection of a plurality of types of communications apparatuses supporting different antenna capabilities is implemented. In addition, if the second target precoding matrix is determined by the network device based on the uplink channel information, it is ensured that when the communications apparatus sends uplink information by using the target physical antenna, system performance is the best, that is, the communications apparatus can select the target physical antenna that enables the best system performance to send uplink information.

The foregoing describes the solutions provided in the embodiments of this application based on functions implemented by the network device and the communications apparatus. It may be understood that, to implement the foregoing respective functions, the network device and the communications apparatus include corresponding hardware structures and/or software modules for performing the functions. With reference to the examples and steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of this application.

In the embodiments of this application, the network device and the communications apparatus may be divided into function modules based on the foregoing method examples. For example, each function module may be obtained through division based on each corresponding function, or two or more functions may be integrated into one processing unit. The foregoing integrated unit may be implemented in a form of hardware, or may be implemented in a form of a software functional module.

Figure 4:
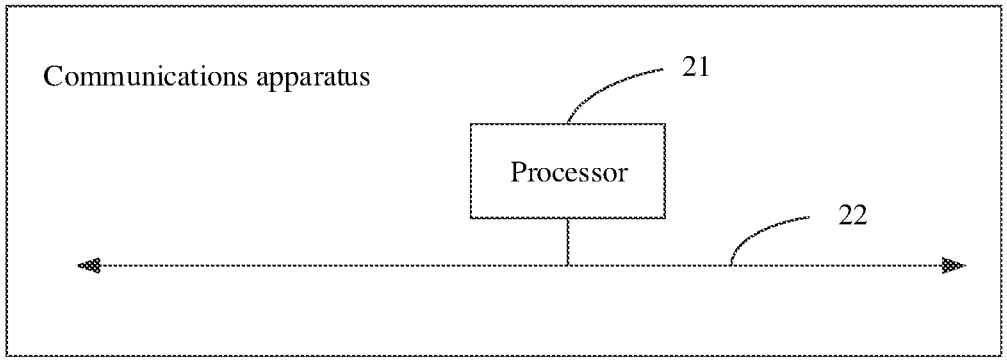
FIG. 4 is a schematic structural diagram 1 of a communications apparatus according to this application.

FIG. 4 is a schematic structural diagram 1 of a communications apparatus according to this application. The communications apparatus includes a processor 21 and a communications bus 22. The processor 21 is configured to invoke a program instruction stored in a memory, to implement the methods in the foregoing method embodiments. The memory is a memory outside the communications apparatus.

Figure 5:
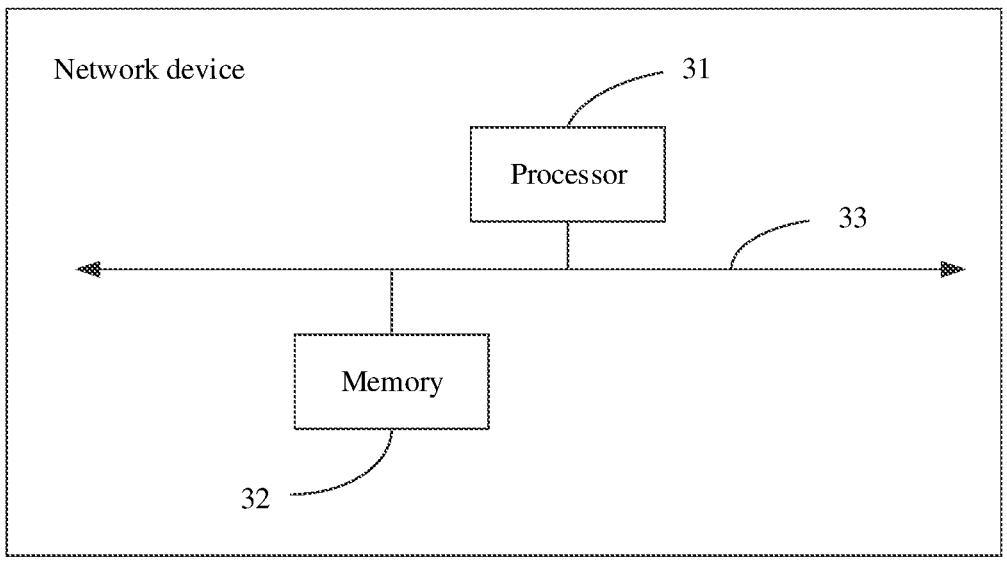
FIG. 5 is a schematic structural diagram 2 of a communications apparatus according to this application.

FIG. 5 is a schematic structural diagram 2 of a communications apparatus according to this application. The communications apparatus includes a processor 31, a memory 32, and a communications bus 33. The processor 31 is configured to invoke a program instruction stored in the memory 32, to implement the methods in the foregoing method embodiments.

The communications apparatuses shown in FIG. 4 and FIG. 5 may be communications apparatuses, or may be chips in the communications apparatuses. The communications apparatuses or the chips have functions of implementing the methods in the foregoing method embodiments. The functions may be implemented by hardware, or may be implemented by hardware by executing corresponding software. The hardware or the software includes one or more units corresponding to the foregoing functions.

The processor mentioned above may be a central processing unit (central processing unit, CPU), a microprocessor, or an application-specific integrated circuit (application specific integrated circuit, ASIC), or may be one or more integrated circuits that are configured to control program execution of the uplink information transmission method in the foregoing aspects or any possible design of the foregoing aspects.

This application further provides a computer storage medium, including an instruction. When the instruction is run on a communications apparatus, the communications apparatus is enabled to perform the corresponding methods in the method embodiments.

This application further provides a computer storage medium, including an instruction. When the instruction is run on a communications apparatus, the network device is enabled to perform the corresponding methods in the method embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, from a network device, an index of a precoding matrix and a quantity of layers to use for uplink transmission;
   determining a first target codebook based on the received quantity of layers and a quantity of physical antennas of a communications apparatus, wherein the first target codebook comprises a plurality of first precoding matrices; and
   determining, based on a first target precoding matrix of the plurality of first precoding matrices that corresponds to the index, a target physical antenna to be used by the communications apparatus to send uplink information.

2. The method according to claim 1, wherein:
   rows of the first target precoding matrix are in a one-to-one correspondence with the physical antennas of the communications apparatus; and
   each physical antenna corresponding to a row of the first target precoding matrix that comprises a non-zero element is used to send uplink information.

3. The method according to claim 2, wherein a quantity of rows of the first target precoding matrix that comprise a non-zero element is greater than or equal to 1 and less than or equal to a quantity of physical antennas that are supported by the communications apparatus and that are simultaneously used for uplink transmission.

4. The method according to claim 1, wherein a quantity of columns of the first target precoding matrix is the same as the quantity of layers.

5. The method according to claim 4, wherein a normalization coefficient of the first target precoding matrix is a reciprocal of a square root of a sum of squares of non-zero elements in the first target precoding matrix.

6. The method according to claim 1, wherein the first target precoding matrix satisfies a preset condition, and the preset condition is $$W^T W = \begin{bmatrix} D_{11} & 0 \\ 0 & D_{12} \end{bmatrix},$$

or the preset condition is $$W^T W = \begin{bmatrix} 0 & D_{12} \\ D_{21} & 0 \end{bmatrix},$$

wherein
   W is the first target precoding matrix, $W^T$ is a conjugate transpose matrix of the first target precoding matrix, $$\begin{bmatrix} D_{11} & 0 \\ 0 & D_{12} \end{bmatrix}$$

is a diagonal matrix, and $$\begin{bmatrix} 0 & D_{12} \\ D_{21} & 0 \end{bmatrix}$$

is a diagonal matrix.

7. The method according to claim 1, wherein the quantity of layers is 1 and the quantity of physical antennas of the communications apparatus is 4, and the first target codebook comprises:

$$\begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix}$$

$$\frac{1}{\sqrt{2}}\begin{bmatrix} 1 \\ 0 \\ 1 \\ 0 \end{bmatrix}, \frac{1}{\sqrt{2}}\begin{bmatrix} 1 \\ 0 \\ -1 \\ 0 \end{bmatrix}, \frac{1}{\sqrt{2}}\begin{bmatrix} 1 \\ 0 \\ j \\ 0 \end{bmatrix}, \frac{1}{\sqrt{2}}\begin{bmatrix} 1 \\ 0 \\ -j \\ 0 \end{bmatrix}$$

$$\frac{1}{\sqrt{2}}\begin{bmatrix} 0 \\ 1 \\ 0 \\ 1 \end{bmatrix}, \frac{1}{\sqrt{2}}\begin{bmatrix} 0 \\ 1 \\ 0 \\ -1 \end{bmatrix}, \frac{1}{\sqrt{2}}\begin{bmatrix} 0 \\ 1 \\ 0 \\ j \end{bmatrix}, \frac{1}{\sqrt{2}}\begin{bmatrix} 0 \\ 1 \\ 0 \\ -j \end{bmatrix}$$

$$\frac{1}{\sqrt{2}}\begin{bmatrix} 1 \\ 1 \\ 0 \\ 0 \end{bmatrix}, \frac{1}{\sqrt{2}}\begin{bmatrix} 1 \\ -1 \\ 0 \\ 0 \end{bmatrix}, \frac{1}{\sqrt{2}}\begin{bmatrix} 1 \\ j \\ 0 \\ 0 \end{bmatrix}, \frac{1}{\sqrt{2}}\begin{bmatrix} 1 \\ -j \\ 0 \\ 0 \end{bmatrix}$$

$$\frac{1}{\sqrt{2}}\begin{bmatrix} 0 \\ 0 \\ 1 \\ 1 \end{bmatrix}, \frac{1}{\sqrt{2}}\begin{bmatrix} 0 \\ 0 \\ 1 \\ 1 \end{bmatrix}, \frac{1}{\sqrt{2}}\begin{bmatrix} 0 \\ 0 \\ 1 \\ j \end{bmatrix}, \frac{1}{\sqrt{2}}\begin{bmatrix} 0 \\ 0 \\ 1 \\ -j \end{bmatrix}$$

$$\frac{1}{\sqrt{2}}\begin{bmatrix} 0 \\ 1 \\ 1 \\ 0 \end{bmatrix}, \frac{1}{\sqrt{2}}\begin{bmatrix} 0 \\ 1 \\ -1 \\ 0 \end{bmatrix}, \frac{1}{\sqrt{2}}\begin{bmatrix} 0 \\ 1 \\ j \\ 0 \end{bmatrix}, \frac{1}{\sqrt{2}}\begin{bmatrix} 0 \\ 1 \\ -j \\ 0 \end{bmatrix}$$

$$\frac{1}{\sqrt{2}}\begin{bmatrix} 1 \\ 0 \\ 0 \\ 1 \end{bmatrix}, \frac{1}{\sqrt{2}}\begin{bmatrix} 1 \\ 0 \\ 0 \\ -1 \end{bmatrix}, \frac{1}{\sqrt{2}}\begin{bmatrix} 1 \\ 0 \\ 0 \\ j \end{bmatrix}, \frac{1}{\sqrt{2}}\begin{bmatrix} 1 \\ 0 \\ 0 \\ -j \end{bmatrix}.$$

8. The method according to claim 1, wherein the quantity of layers is 2, the quantity of physical antennas of the communications apparatus is 4, and the first target codebook comprises:

$$\frac{1}{\sqrt{2}}\begin{bmatrix} 1 & 0 \\ 0 & 0 \\ 0 & 1 \\ 0 & 0 \end{bmatrix}, \frac{1}{2}\begin{bmatrix} 1 & 1 \\ 0 & 0 \\ 1 & -1 \\ 0 & 0 \end{bmatrix}, \frac{1}{2}\begin{bmatrix} 1 & 1 \\ 0 & 0 \\ j & -j \\ 0 & 0 \end{bmatrix}$$

$$\frac{1}{\sqrt{2}}\begin{bmatrix} 0 & 0 \\ 1 & 0 \\ 0 & 0 \\ 0 & 1 \end{bmatrix}, \frac{1}{2}\begin{bmatrix} 0 & 0 \\ 1 & 1 \\ 0 & 0 \\ 1 & -1 \end{bmatrix}, \frac{1}{2}\begin{bmatrix} 0 & 0 \\ 1 & 1 \\ 0 & 0 \\ j & -j \end{bmatrix}$$

-continued $$\frac{1}{\sqrt{2}}\begin{bmatrix}1&0\\0&1\\0&0\\0&0\end{bmatrix}\ \frac{1}{2}\begin{bmatrix}1&1\\1&-1\\0&0\\0&0\end{bmatrix}\ \frac{1}{2}\begin{bmatrix}1&1\\j&-j\\0&0\\0&0\end{bmatrix}$$

$$\frac{1}{\sqrt{2}}\begin{bmatrix}0&0\\0&0\\1&0\\0&1\end{bmatrix}\ \frac{1}{2}\begin{bmatrix}0&0\\0&0\\1&1\\1&-1\end{bmatrix}\ \frac{1}{2}\begin{bmatrix}0&0\\0&0\\1&1\\j&-j\end{bmatrix}$$

$$\frac{1}{\sqrt{2}}\begin{bmatrix}0&0\\1&0\\0&1\\0&0\end{bmatrix}\ \frac{1}{2}\begin{bmatrix}0&0\\1&1\\1&-1\\0&0\end{bmatrix}\ \frac{1}{2}\begin{bmatrix}0&0\\1&1\\j&-j\\0&0\end{bmatrix}$$

$$\frac{1}{\sqrt{2}}\begin{bmatrix}1&0\\0&0\\0&0\\0&1\end{bmatrix}\ \frac{1}{2}\begin{bmatrix}1&1\\0&0\\0&0\\1&-1\end{bmatrix}\ \frac{1}{2}\begin{bmatrix}1&1\\0&0\\0&0\\j&-j\end{bmatrix}.$$

9. The method according to claim 1, wherein when the quantity of layers is 1 and the quantity of physical antennas of the communications apparatus is 4, the first target codebook comprises:

$$\frac{1}{2}\begin{bmatrix}1\\1\\1\\-1\end{bmatrix}\ \frac{1}{2}\begin{bmatrix}1\\1\\j\\j\end{bmatrix}\ \frac{1}{2}\begin{bmatrix}1\\1\\-1\\1\end{bmatrix}\ \frac{1}{2}\begin{bmatrix}1\\1\\-j\\-j\end{bmatrix}\ \frac{1}{2}\begin{bmatrix}1\\j\\1\\j\end{bmatrix}\ \frac{1}{2}\begin{bmatrix}1\\j\\j\\1\end{bmatrix}\ \frac{1}{2}\begin{bmatrix}1\\j\\-1\\-j\end{bmatrix}\ \frac{1}{2}\begin{bmatrix}1\\j\\-j\\-1\end{bmatrix}$$

$$\frac{1}{2}\begin{bmatrix}1\\-1\\1\\1\end{bmatrix}\ \frac{1}{2}\begin{bmatrix}1\\-1\\j\\-j\end{bmatrix}\ \frac{1}{2}\begin{bmatrix}1\\-1\\-1\\-1\end{bmatrix}$$

$$\frac{1}{2}\begin{bmatrix}1\\-1\\-j\\j\end{bmatrix}\ \frac{1}{2}\begin{bmatrix}1\\-j\\1\\-j\end{bmatrix}\ \frac{1}{2}\begin{bmatrix}1\\-j\\j\\-1\end{bmatrix}\ \frac{1}{2}\begin{bmatrix}1\\-j\\-1\\j\end{bmatrix}\ \frac{1}{2}\begin{bmatrix}1\\-j\\-j\\1\end{bmatrix}$$

$$\frac{1}{\sqrt{2}}\begin{bmatrix}1\\0\\1\\0\end{bmatrix}\ \frac{1}{\sqrt{2}}\begin{bmatrix}1\\0\\-1\\0\end{bmatrix}\ \frac{1}{\sqrt{2}}\begin{bmatrix}1\\0\\j\\0\end{bmatrix}\ \frac{1}{\sqrt{2}}\begin{bmatrix}1\\0\\-j\\0\end{bmatrix}$$

$$\frac{1}{\sqrt{2}}\begin{bmatrix}0\\1\\0\\1\end{bmatrix}\ \frac{1}{\sqrt{2}}\begin{bmatrix}0\\1\\0\\-1\end{bmatrix}\ \frac{1}{\sqrt{2}}\begin{bmatrix}0\\1\\0\\j\end{bmatrix}\ \frac{1}{\sqrt{2}}\begin{bmatrix}0\\1\\0\\-j\end{bmatrix}$$

$$\begin{bmatrix}1\\0\\0\\0\end{bmatrix}\ \begin{bmatrix}0\\1\\0\\0\end{bmatrix}\ \begin{bmatrix}0\\0\\1\\0\end{bmatrix}\ \begin{bmatrix}0\\0\\0\\1\end{bmatrix}\ \frac{1}{\sqrt{2}}\begin{bmatrix}1\\1\\0\\0\end{bmatrix}\ \frac{1}{\sqrt{2}}\begin{bmatrix}1\\-1\\0\\0\end{bmatrix}\ \frac{1}{\sqrt{2}}\begin{bmatrix}1\\j\\0\\0\end{bmatrix}\ \frac{1}{\sqrt{2}}\begin{bmatrix}1\\-j\\0\\0\end{bmatrix}$$

$$\frac{1}{\sqrt{2}}\begin{bmatrix}0\\0\\1\\1\end{bmatrix}\ \frac{1}{\sqrt{2}}\begin{bmatrix}0\\0\\1\\-1\end{bmatrix}\ \frac{1}{\sqrt{2}}\begin{bmatrix}0\\0\\1\\j\end{bmatrix}\ \frac{1}{\sqrt{2}}\begin{bmatrix}0\\0\\1\\-j\end{bmatrix}$$

$$\frac{1}{\sqrt{2}}\begin{bmatrix}0\\1\\1\\0\end{bmatrix}\ \frac{1}{\sqrt{2}}\begin{bmatrix}0\\1\\-1\\0\end{bmatrix}\ \frac{1}{\sqrt{2}}\begin{bmatrix}0\\1\\j\\0\end{bmatrix}\ \frac{1}{\sqrt{2}}\begin{bmatrix}0\\1\\-j\\0\end{bmatrix}$$

$$\frac{1}{\sqrt{2}}\begin{bmatrix}1\\0\\0\\1\end{bmatrix}\ \frac{1}{\sqrt{2}}\begin{bmatrix}1\\0\\0\\-1\end{bmatrix}\ \frac{1}{\sqrt{2}}\begin{bmatrix}1\\0\\0\\j\end{bmatrix}\ \frac{1}{\sqrt{2}}\begin{bmatrix}1\\0\\0\\-j\end{bmatrix}.$$

10. The method according to claim 1, wherein the quantity of layers is 2, the quantity of physical antennas of the communications apparatus is 4, and the first target codebook comprises:

$$\frac{1}{2}\begin{bmatrix}1&0\\1&0\\0&1\\0&-j\end{bmatrix}\ \frac{1}{2}\begin{bmatrix}1&0\\1&0\\0&1\\0&j\end{bmatrix}\ \frac{1}{2}\begin{bmatrix}1&0\\-j&0\\0&1\\0&1\end{bmatrix}\ \frac{1}{2}\begin{bmatrix}1&0\\-j&0\\0&1\\0&-1\end{bmatrix}$$

$$\frac{1}{2}\begin{bmatrix}1&0\\-1&0\\0&1\\0&-j\end{bmatrix}\ \frac{1}{2}\begin{bmatrix}1&0\\-1&0\\0&1\\0&j\end{bmatrix}\ \frac{1}{2}\begin{bmatrix}1&0\\j&0\\0&1\\0&1\end{bmatrix}\ \frac{1}{2}\begin{bmatrix}1&0\\j&0\\0&1\\0&-1\end{bmatrix}$$

$$\frac{1}{2}\begin{bmatrix}1&0\\0&1\\1&0\\0&1\end{bmatrix}\ \frac{1}{2}\begin{bmatrix}1&0\\0&1\\1&0\\0&-1\end{bmatrix}\ \frac{1}{2}\begin{bmatrix}1&0\\0&1\\-1&0\\0&1\end{bmatrix}\ \frac{1}{2}\begin{bmatrix}1&0\\0&1\\-1&0\\0&-1\end{bmatrix}$$

$$\frac{1}{2}\begin{bmatrix}1&0\\0&1\\0&1\\1&0\end{bmatrix}\ \frac{1}{2}\begin{bmatrix}1&0\\0&1\\0&-1\\1&0\end{bmatrix}\ \frac{1}{2}\begin{bmatrix}1&0\\0&1\\0&1\\-1&0\end{bmatrix}\ \frac{1}{2}\begin{bmatrix}1&0\\0&1\\0&-1\\-1&0\end{bmatrix}$$

$$\frac{1}{\sqrt{2}}\begin{bmatrix}1&0\\0&0\\0&1\\0&0\end{bmatrix}\ \frac{1}{2}\begin{bmatrix}1&1\\0&0\\1&-1\\0&0\end{bmatrix}\ \frac{1}{2}\begin{bmatrix}1&1\\0&0\\j&-j\\0&0\end{bmatrix}$$

$$\frac{1}{\sqrt{2}}\begin{bmatrix}0&0\\1&0\\0&0\\0&1\end{bmatrix}\ \frac{1}{2}\begin{bmatrix}0&0\\1&1\\0&0\\1&-1\end{bmatrix}\ \frac{1}{2}\begin{bmatrix}0&0\\1&1\\0&0\\j&-j\end{bmatrix}$$

$$\frac{1}{\sqrt{2}}\begin{bmatrix}1&0\\0&1\\0&0\\0&0\end{bmatrix}\ \frac{1}{2}\begin{bmatrix}1&1\\1&-1\\0&0\\0&0\end{bmatrix}\ \frac{1}{2}\begin{bmatrix}1&1\\j&-j\\0&0\\0&0\end{bmatrix}$$

$$\frac{1}{\sqrt{2}}\begin{bmatrix}0&0\\0&0\\1&0\\0&1\end{bmatrix}\ \frac{1}{2}\begin{bmatrix}0&0\\0&0\\1&1\\1&-1\end{bmatrix}\ \frac{1}{2}\begin{bmatrix}0&0\\0&0\\1&1\\j&-j\end{bmatrix}$$

$$\frac{1}{\sqrt{2}}\begin{bmatrix}0&0\\1&0\\0&1\\0&0\end{bmatrix}\ \frac{1}{2}\begin{bmatrix}0&0\\1&1\\1&-1\\0&0\end{bmatrix}\ \frac{1}{2}\begin{bmatrix}0&0\\1&1\\j&-j\\0&0\end{bmatrix}$$

-continued $$\frac{1}{\sqrt{2}}\begin{bmatrix}1&0\\0&0\\0&0\\0&1\end{bmatrix}, \frac{1}{2}\begin{bmatrix}1&1\\0&0\\0&0\\1&-1\end{bmatrix}, \frac{1}{2}\begin{bmatrix}1&1\\0&0\\0&0\\j&-j\end{bmatrix}.$$

11. The method according to claim 1, further comprising:
sending antenna capability reporting information to the network device, wherein the antenna capability reporting information indicates an antenna capability of the communications apparatus, and the antenna capability of the communications apparatus comprises:
the communications apparatus supports closed-loop antenna selection;
the quantity of physical antennas comprised in the communications apparatus;
the quantity of physical antennas that are supported by the communications apparatus and that are simultaneously used for uplink transmission; or
a physical antenna that is supported by the communications apparatus and that is simultaneously used for uplink transmission.

12. The method according to claim 1, wherein:
the first target codebook is a subset of a first codebook;
receiving, from the network device, the index of the precoding matrix comprises:
receiving downlink control information (DCI) from the network device, wherein the DCI comprises the index of the precoding matrix; and
determining the first target codebook based on the quantity of layers and the quantity of physical antennas comprised in a communications apparatus comprises:
determining the first codebook based on the quantity of layers and the quantity of physical antennas comprised in the communications apparatus; and
obtaining the first target codebook based on a time domain occupied by the DCI, wherein the first codebook comprises a first precoding matrix group and a second precoding matrix group, and when the time domain occupied by the DCI is odd-numbered, the first precoding matrix group is used to obtain the first target codebook, or when the time domain occupied by the DCI is even-numbered, the second precoding matrix group is used to obtain the first target codebook.

13. An apparatus, comprising:
a processor; and
a non-transitory computer-readable storage medium storing a program to be executed by the processor, the program including instructions for:
determining a quantity of layers for uplink transmission and a quantity of physical antennas of a communications apparatus;
determining a first target precoding matrix based on the quantity of layers for uplink transmission and the quantity of physical antennas of the communications apparatus; and
sending the quantity of layers and an index of the first target precoding matrix in a first target codebook to the communications apparatus, wherein the first target precoding matrix indicates a target physical antenna used by the communications apparatus to send uplink information, the first target codebook comprises a plurality of first precoding matrices, and rows of the first target precoding matrix are in a one-to-one correspondence with the physical antennas of the communications apparatus, and wherein each physical antenna corresponding to a row of the first target precoding matrix that comprises a non-zero element is used to send uplink information.

14. The apparatus according to claim 13, wherein a quantity of rows of the first target precoding matrix that comprise a non-zero element is greater than or equal to 1 and less than or equal to a quantity of physical antennas that are supported by the communications apparatus and that are simultaneously used for uplink transmission.

15. The apparatus according to claim 13, wherein a quantity of columns of the first target precoding matrix is the same as the quantity of layers.

16. A communications apparatus, comprising:
a processor; and
a non-transitory computer-readable storage medium storing a program to be executed by the processor, the program including instructions for:
receiving, from a network device, an index of a precoding matrix and a quantity of layers to use for uplink transmission;
determining a first target codebook based on the received quantity of layers and a quantity of physical antennas of the communications apparatus, wherein the first target codebook comprises a plurality of first precoding matrices; and
determining, based on a first target precoding matrix of the plurality of first precoding matrices that corresponds to the index, a target physical antenna to be used by the communications apparatus to send uplink information.

17. The communications apparatus according to claim 16, wherein:
rows of the first target precoding matrix are in a one-to-one correspondence with the physical antennas of the communications apparatus; and
each physical antenna corresponding to a row of the first target precoding matrix that comprises a non-zero element is used to send uplink information.

18. The communications apparatus according to claim 17, wherein a quantity of rows of the first target precoding matrix that comprise a non-zero element is greater than or equal to 1 and less than or equal to a quantity of physical antennas that are supported by the communications apparatus and that are simultaneously used for uplink transmission.

19. The communications apparatus according to claim 16, wherein a quantity of columns of the first target precoding matrix is the same as the quantity of layers.

* * * * *